US008220715B2

(12) United States Patent
Uehara et al.

(10) Patent No.: US 8,220,715 B2
(45) Date of Patent: Jul. 17, 2012

(54) MEDIA STORAGE APPARATUS AND MEDIA PROCESSING APPARATUS

(75) Inventors: Shigehiko Uehara, Nagano-ken (JP); Toru Takami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 870 days.

(21) Appl. No.: 12/039,061

(22) Filed: Feb. 28, 2008

(65) Prior Publication Data

US 2008/0210760 A1 Sep. 4, 2008

(30) Foreign Application Priority Data

Mar. 1, 2007 (JP) ................................ 2007-051234
Mar. 1, 2007 (JP) ................................ 2007-051235
Aug. 6, 2007 (JP) ................................ 2007-203871
Aug. 7, 2007 (JP) ................................ 2007-205042

(51) Int. Cl.
*G06K 13/00* (2006.01)

(52) U.S. Cl. ......................... 235/475; 235/379; 235/449

(58) Field of Classification Search .................. 235/379, 235/380, 449, 383, 475
See application file for complete search history.

(56) References Cited

U.S. PATENT DOCUMENTS 5,438,186 A * 8/1995 Nair et al. ..................... 235/449
5,444,616 A * 8/1995 Nair et al. ....................... 705/17
5,741,009 A 4/1998 Kawano et al.
6,473,519 B1 * 10/2002 Pidhirny et al. ............... 382/140
6,848,850 B2 2/2005 Matsuo et al.
7,140,796 B2 11/2006 Matsuo et al.
7,195,411 B2 3/2007 Matsuo et al.
7,686,296 B2 3/2010 Kaneko et al.
2004/0022567 A1 2/2004 Fukatsu et al.
2005/0129441 A1 6/2005 Hirabayashi
2007/0009308 A1 1/2007 Shoji et al.

FOREIGN PATENT DOCUMENTS

JP 55-125237 A 2/1979
JP 57-18546 U 1/1982
JP 59-007660 A 1/1984
JP 61-135847 U 8/1986
JP 62-230557 A 10/1987
JP 63-041347 A 2/1988
JP 01-127559 A 5/1989
JP 04-129765 A 4/1992
JP 6-53558 7/1994
JP 07-149013 A 6/1995
JP 08-081112 A 3/1996
JP 09-048414 A 2/1997
JP 10-212047 8/1998
JP 2000-318904 11/2000
JP 2001-274930 10/2001
JP 2003-182916 7/2003

(Continued)

*Primary Examiner* — Karl D. Frech

(57) ABSTRACT

A first in-feed roller (49) and a pressure roller (80) are disposed to the first check storage unit (11) of a check processing apparatus (1). A first pressure member (85) that is urged toward the first in-feed roller (49) is pivotably attached to the pressure roller (80). When a check (4) is conveyed and the check (4) moves completely passed the nipping position (49A) of the first in-feed roller (49), the trailing end (**4*d*) part of the check (4) is pressed by the first pressure member (85) to the first in-feed roller (49). The check (4) is thus dependably fed into the check storage unit, the trailing end (4*d*) of the check is pushed sideways by the first pressure member (85), and the trailing end (4*d*) will not interfere with the next check (4**).

18 Claims, 17 Drawing Sheets

FOREIGN PATENT DOCUMENTS

| | | | |
|---|---|---|---|
| JP | 2003-252507 | | 9/2003 |
| JP | 2004-091178 | A | 3/2004 |
| JP | 2004-206362 | | 7/2004 |
| JP | 2004-206362 | A | 7/2004 |
| JP | 2005-161844 | | 6/2005 |
| JP | 2005-161844 | A | 6/2005 |
| JP | 2006-82910 | | 3/2006 |
| JP | 2006-089195 | A | 4/2006 |
| JP | 2007-15808 | | 1/2007 |

* cited by examiner

MEDIA STORAGE APPARATUS AND MEDIA PROCESSING APPARATUS

CROSS-REFERENCE TO RELATED APPLICATIONS

Japanese Patent application No.(s) 2007-051234, 2007-051235, 2007-205042 and 2007-203871, are hereby incorporated by reference in its/their entirety.

BACKGROUND

1. Field of Invention

The present invention relates to a media storage apparatus for storing sheet media. The invention relates more particularly to a media storage apparatus that is incorporated in a media processing apparatus such as a check processing device and is used to receive and store checks and other sheet media after processing such as scanning, reading, and printing is completed.

2. Description of Related Art

Banks and other financial institutions commonly use check reading devices ("check reader" or "check scanner") to image and read magnetic ink characters from documents such as checks, promissory notes, and invoice stubs, and sort and process the documents based on the result of reading the documents (collectively referred to below as checks). The document surface is imaged and magnetic ink characters are read while the check is conveyed through the transportation path of the check reader, and after reading is completed the check is stored in a check storage device located at the discharge end of the transportation path. The check storage device has a long, narrow, box-like check storage unit corresponding to the shape of the checks, and the checks are fed into the check storage unit by an in-feed roller located at one end of the check storage unit. A check reader of this type is taught in Japanese Unexamined Patent Appl. Pub. JP-A-2004-206362.

The checks are conveyed in an upright position through a transportation path that is a long, narrow vertical slot as the information on each check is read and processed. The processed checks are then fed into the check storage unit in the same upright position by the in-feed roller, and stored in the check storage unit. A check pressure plate is also disposed to the check storage unit for pressing the supplied checks to the side of the storage unit. The checks that are delivered in the upright position into the check storage unit by the in-feed roller enter between the check pressure plate and the previously stored checks while pushing the check pressure plate out of the way. The checks fed into the check storage unit are thus stored stacked in an upright position between the storage unit side wall and the check pressure plate.

When the checks are fed into the check storage unit, a sliding load is produced as the check slides over the check pressure plate. A sliding load also occurs between the check that is being fed in and the surface of the top check in the previously stored stack. The checks can be reliably fed into the check storage unit by forming raised protrusions for feeding the checks on the outside surface of the in-feed roller. After a check has passed the nipping position of the in-feed roller and the pressure roller pressed thereto, the trailing end of the check is further fed into the check storage unit by these protrusions on the in-feed roller. A check reading apparatus having an in-feed roller on which these protrusions are formed is taught in Japanese Unexamined Patent Appl. Pub. JP-A-2005-161844.

However, if the check is particularly thin or pliable, the check may not be able to withstand the sliding load against the check pressure plate or the sliding load against the previously stored checks, and may easily bend and become creased or wrinkled.

For example, the trailing end part of the check that is pushed in by the in-feed roller tends to easily curve laterally because it cannot withstand the sliding load on the check. Even if protrusions as described above are formed on the in-feed roller, the trailing end part of the check will flex and move laterally away from the protrusions, and the protrusions may not be able to sufficiently feed the check into the check storage unit.

The leading end part of the check fed into the check storage unit from the nipping position of the in-feed roller and the pressure roller may also not be able to withstand the sliding load, and may bend or deflect. Even after the trailing end of the check passes the nipping position of the in-feed roller, the leading end part of the check may stop near the nipping position of the in-feed roller instead of being sufficiently fed between the side wall of the storage unit and the check pressure plate.

If the check cannot be sufficiently fed between the storage unit side wall and the check pressure plate, the trailing end part of the check will be left protruding to the in-feed roller side from between the storage unit side wall and the check pressure plate. In some cases the trailing end part of the check may even stop near the nipping part of the in-feed roller. If a check is not properly stored, the trailing end of the protruding check will obstruct the path of the next check, and it may not be possible to feed the next check into the check storage unit. The likelihood of the trailing end of one check interfering with feeding and storing the next check is particularly high when the trailing end part of the first check is bent, folded, or deflected.

SUMMARY OF INVENTION

A media storage apparatus enables depositing sheet media into a media storage unit so that the trailing end part of a sheet medium stored in the media storage unit does not obstruct the path of the next sheet medium to be stored.

A media processing apparatus according to another aspect of the invention has the novel media storage apparatus of the invention.

A media storage apparatus according to a first aspect of the invention has a media storage unit for storing sheet media; an in-feed roller for conveying sheet media into the media storage unit; a pressure roller for pressing sheet media to the in-feed roller; and a first pressure member for pushing a part of the sheet medium toward the in-feed roller after the sheet medium passes the sheet media nipping position of the in-feed roller and the pressure roller.

The first pressure member in the media storage apparatus according to this aspect of the invention continues pushing the sheet medium to the in-feed roller after the sheet medium has completely passed the nipping position of the in-feed roller and pressure roller. The trailing end part of the sheet medium is therefore held pressed toward the outside surface of the in-feed roller even after passing the nipping position, and is therefore fed in the direction of in-feed roller rotation. The trailing end part of the sheet medium is thus advanced laterally to the transportation direction from a point downstream of the nipping position, and thus does not obstruct the path of the next sheet medium. Problems such as the leading end of the next sheet medium colliding with the trailing end part of a sheet medium stored in the media storage unit, and the next sheet medium being unable to be fed into the media storage unit are thus prevented.

Further preferably, the first pressure member can move toward and away from the in-feed roller, and a first urging member such as a spring urges the first pressure member toward the in-feed roller.

Yet further preferably, the first pressure member can pivot on the axle of the pressure roller toward and away from the in-feed roller.

Yet further preferably, so that the trailing end part of the sheet medium is positively engaged with the outside surface of the in-feed roller by the first pressure member, the first pressure member has a concavely curved pressure surface corresponding to the outside surface of the in-feed roller on the distal end part of the pivoting side, and the pressure surface is opposite the outside surface of the in-feed roller on the downstream side of the nipping position in the transportation direction.

In a media storage apparatus according to another aspect of the invention, the media storage unit has a diagonal guide surface that guides sheet media advanced from the nipping position to the media storage unit in a direction inclined toward the in-feed roller side relative to the sheet media transportation direction, a first storage unit side wall that extends contiguously to the diagonal guide surface substantially parallel to the transportation direction on the downstream side, and a media pressure member for pressing sheet media conveyed into the media storage unit toward the first storage unit side wall.

Sheet media conveyed by the in-feed roller is advanced guided by the diagonal guide surface, and is thus conveyed at an angle to the sheet media already stored between the media pressure member and the first storage unit side wall of the media storage unit. The sheet media can thus be advanced without colliding with the trailing end part of the previously stored sheet media.

Alternatively, there could be a media pressure member for guiding sheet media conveyed by the in-feed roller to a second storage unit side wall that is opposite the first storage unit side wall of the media storage unit, and pressing the sheet media to the second storage unit side wall.

In a media storage apparatus according to another aspect of the invention, the in-feed roller has a roller body, a cylindrical part that extends coaxially from both axial ends of the roller body, and is elastically deformable to the inside in the radial direction, and a plurality of protrusions projecting radially from the outside surface of both cylindrical parts.

When a sheet medium made from stiff (rigid) stock is advanced by the in-feed roller, the cylindrical part deflects radially to the inside so that the protrusions recede radially to the inside. Such stiff or rigid sheet media can therefore be conveyed without bending, and an excessive feed load is not applied to the in-feed roller. Furthermore, because the sliding load on the protrusions does not increase, wear can be reduced. Noise also does not increase as a result of bending while conveying the sheet media.

Furthermore, if the sheet medium conveyed by the in-feed roller jams and must be removed, the sheet medium can be easily removed because the cylindrical part deflects radially to the inside and the protrusions retreat radially to the inside when pulling the sheet medium out.

So that the cylindrical part where the protrusions are formed deflects easily, the protrusions are formed on the outside surfaces of the cylindrical parts separated in the axial direction from both ends of the roller body. This renders the cylindrical part between the ends of the roller body and the protrusions, and this part can bend easily to the inside in the axial direction.

Preferably, the roller body and the cylindrical parts are a unimorphous molding. Yet further preferably, the roller body and the cylindrical parts are a unimorphous molding made from an elastic material.

A media storage apparatus according to another aspect of the invention has a second pressure member for pushing sheet media that has passed the nipping position toward a second storage unit side wall, which is positioned on the in-feed roller side on the upstream side of the media storage unit.

A sheet medium that has completely passed the nipping position is moved by the second pressure member to the second storage unit side wall side. For example, if the trailing end part of the sheet medium fed into the media storage unit bends much laterally, the trailing end may return to the first pressure member side, that is, to the downstream side of the nipping position, after the trailing end of the sheet medium separates from the first pressure member. However, because the second pressure member positioned downstream from the first pressure member pushes the trailing end part of the sheet medium toward the second storage unit side wall, problems caused by the trailing end of the sheet medium remaining in the path of the next sheet medium and obstructing transportation of the next sheet medium can be avoided.

Preferably, the second pressure member can move toward and away from the second storage unit side wall, and a second urging member such as a spring urges the second pressure member toward the second storage unit side wall. Yet further preferably, the second pressure member can pivot toward and away from the second storage unit side wall.

Yet further preferably, in order to reliably separate the sheet medium fed into the media storage unit from the downstream side of the nipping position and push the sheet medium to the second storage unit side wall, the distal end of the second pressure member can pivot passed the in-feed roller, that is, across the width of the media storage unit, to a position closer to the second storage unit side wall.

Yet further preferably, in order to quickly send the trailing end part of the sheet medium to the second storage unit side wall after the sheet medium is conveyed into the media storage unit by the in-feed roller and pressure roller, the pivot axis of the second pressure member is the pivot axis of the pressure roller.

Yet further preferably, the media storage unit has a diagonal guide surface that guides sheet media advanced from the nipping position to the media storage unit in a direction inclined toward the in-feed roller side relative to the sheet media transportation direction; and the pivot axis of the second pressure member is positioned between the nipping position and the downstream end of the diagonal guide surface in the sheet medium transportation direction. In this case the trailing end part of the sheet medium guided by the diagonal guide surface can be pushed by the second pressure member toward the second storage unit side wall. The sheet medium will therefore not be left along the diagonal guide surface, and the path of the next sheet medium will not be obstructed.

Yet further preferably, in order to store the sheet media conveyed into the media storage unit stacked from the second storage unit side wall toward the first storage unit side wall, the media storage apparatus also has a media pressure member for guiding and pushing sheet media conveyed to the media storage unit to the second storage unit side wall.

In another aspect of the invention the second pressure member is attached to the first pressure member, and is urged by the first urging member toward the second storage unit side wall.

Another aspect of the invention is a media processing apparatus that has a transportation path for conveying sheet media; an information reader for reading information from sheet media conveyed along the transportation path; and a media storage apparatus for storing sheet media discharged from the transportation path after the information is read. The media storage apparatus has a media storage unit for storing sheet media; an in-feed roller for conveying sheet media into the media storage unit; a pressure roller for pressing sheet media to the in-feed roller; and a first pressure member for pushing a part of the sheet medium toward the in-feed roller after the sheet medium passes the sheet media nipping position of the in-feed roller and the pressure roller.

The media processing apparatus according to the invention can reliably store process sheet media in the media storage apparatus without jamming. Sheet media can therefore be processed efficiently.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

A preferred embodiment of a media processing apparatus having a media storage apparatus according to the present invention is described below with reference to the accompanying figures.

Embodiment 1

A check processing apparatus according to a first embodiment of the invention is described next with reference to FIG. 1A to FIG. 10B.

General Configuration

Figure 1A:
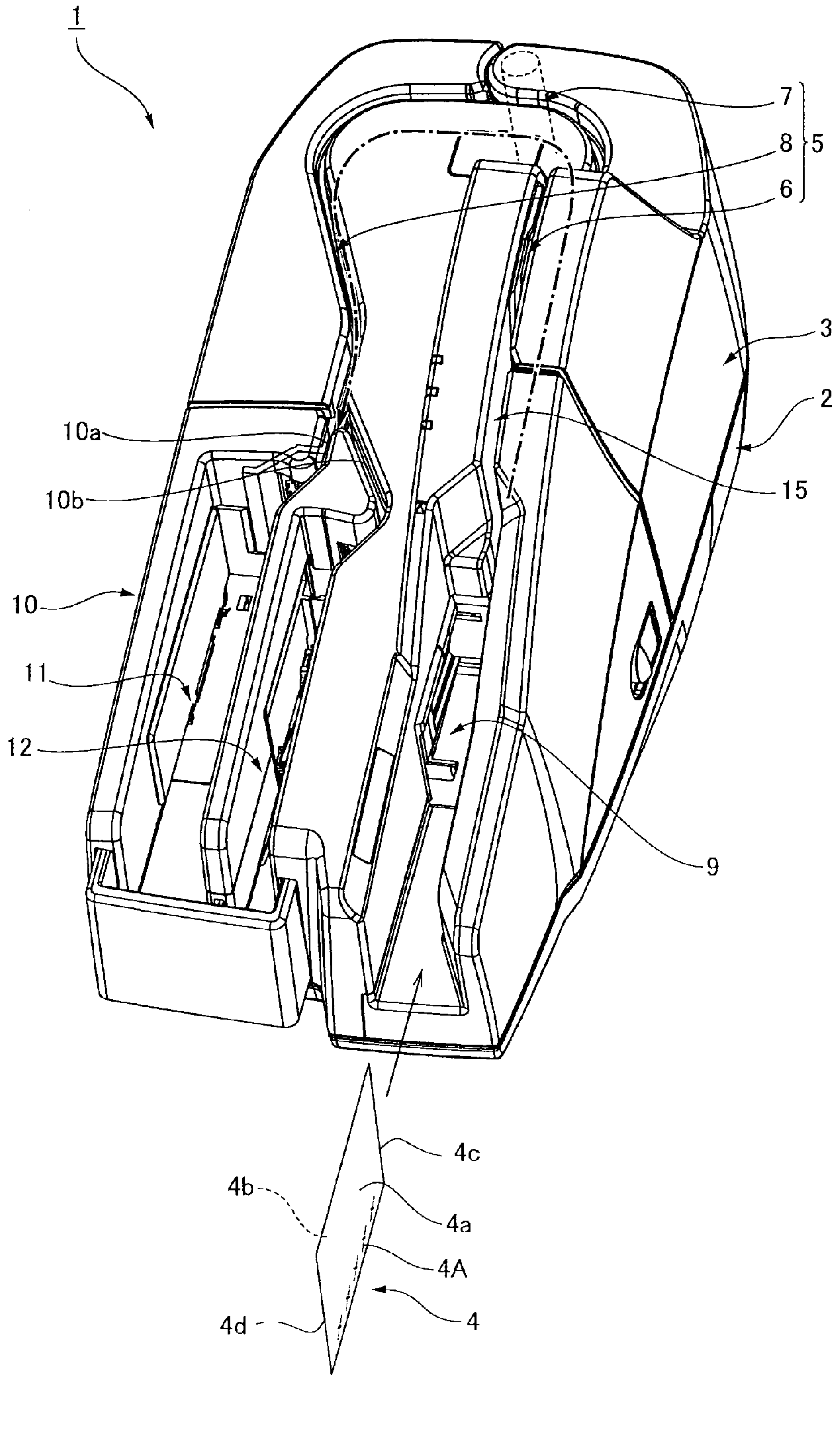
FIG. 1A is an external, perspective view of a check processing apparatus according to the present invention.
Figure 1B:
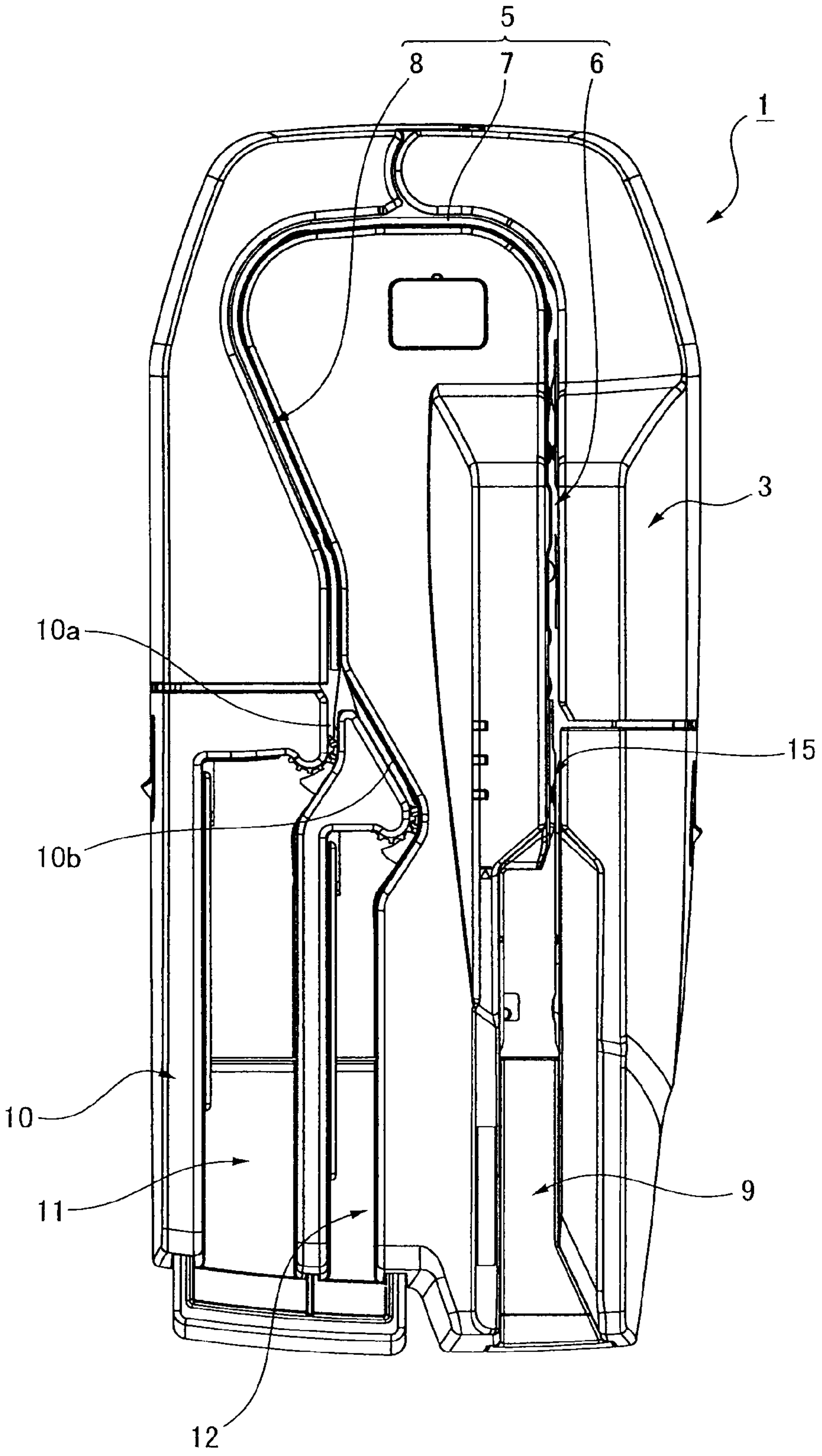
FIG. 1B is a plan view of the check processing apparatus.

FIG. 1A is an external perspective view and FIG. 1B is a plan view of a check processing apparatus 1 according to a preferred embodiment of the invention.

This check processing apparatus 1 has a case 2 and an operable cover 3 covering the top of the case 2 with the parts of the check processing apparatus 1 contained inside. A transportation path 5 for conveying checks 4 (sheet media) is formed between the case 2 and the operable cover 3.

The check transportation path 5 is a narrow vertical slot that curves in a basic U-shaped configuration when seen from above, and includes a straight upstream-side transportation path portion 6, a slightly curving downstream-side transportation path portion 8, and a curving transportation path portion 7 that connects the upstream and downstream portions 6 and 8.

The upstream end of the upstream-side transportation path portion 6 is connected to a check insertion unit 9, which is a wide vertical slot. The downstream end of the downstream-side transportation path portion 8 is connected to a check storage device 10 (media storage apparatus).

The check storage device 10 includes left and right diversion paths 10*a* and 10*b* and first and second check storage units 11 and 12. The diversion paths 10*a* and 10*b* branch to the left and right from the downstream-side transportation path portion 8. The first and second check discharge units 11 and 12 are relatively wide vertical slots that communicate with the diversion paths 10*a* and 10*b*.

Each check 4 has the magnetic ink characters line 4A printed along the long bottom edge on the front 4*a* of the check 4. Also recorded on the front 4*a* against a patterned background are the check amount, payer and payee, various numbers, and the payer signature. An endorsement is recorded on the back 4*b* of the check 4.

Internal Arrangement

Figure 2:
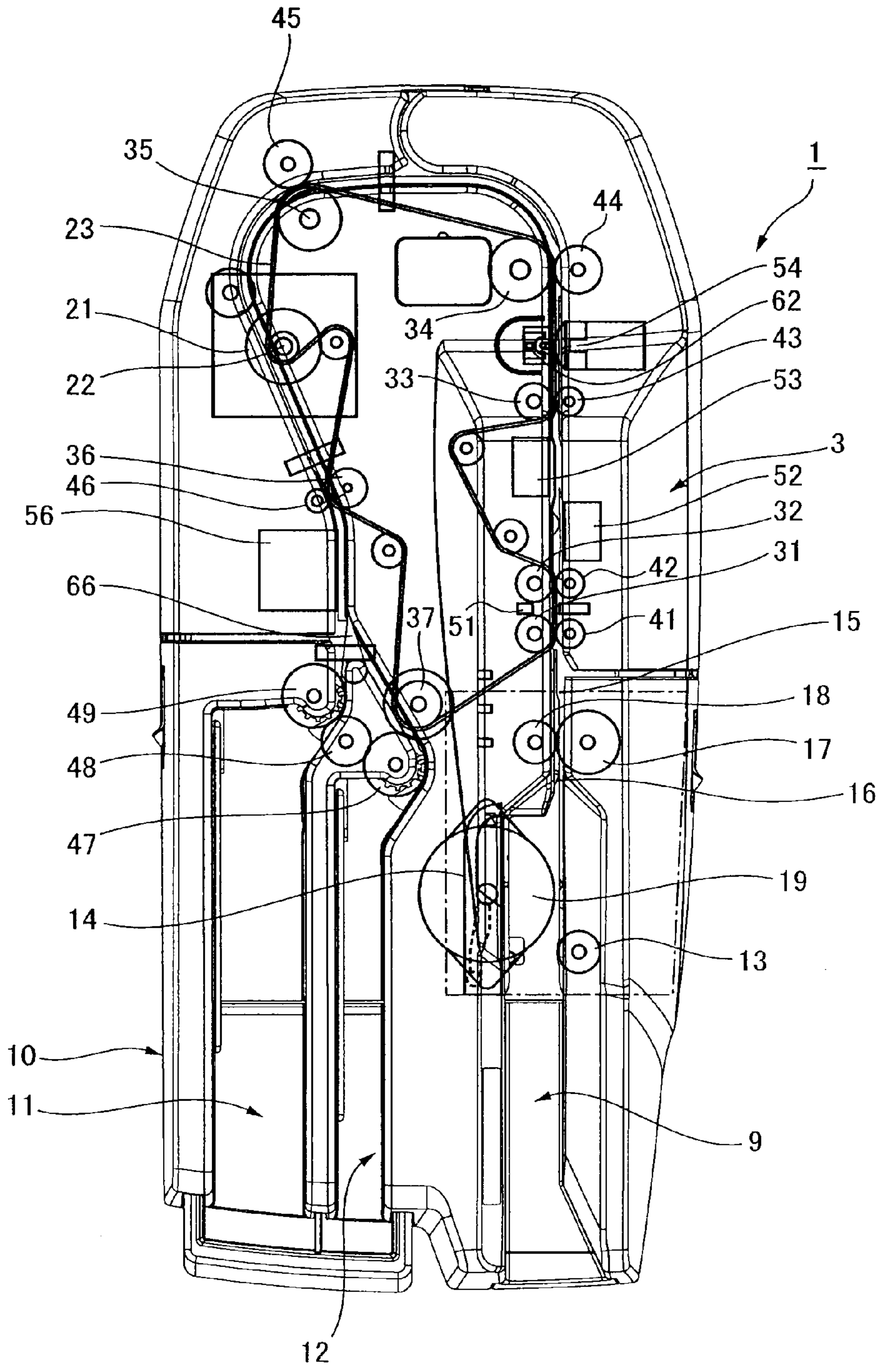
FIG. 2 describes the internal arrangement of the check processing apparatus.

FIG. 2 describes the internal arrangement of the check processing apparatus 1.

As shown in the figure, an in-feed roller 13 and a pressure member 14 are attached to the check insertion unit 9. The in-feed roller 13 feeds checks 4 which are loaded in a stack in the check insertion unit 9 one at a time into the check transportation path 5. The pressure member 14 presses the checks 4 against the in-feed roller 13.

Attached to the check in-feed path 15 for feeding the checks 4 delivered by the in-feed roller 13 into the check transportation path 5 are a separation pad 16 and a pair of separation rollers including a separation roller 17 and a retard roller 18. The separation pad 16, separation roller 17, and retard roller 18 render a separation mechanism for separating and feeding the checks 4 one at a time from the stack into the check transportation path 5. The in-feed roller 13, the separation roller 17, and the pressure member 14 are driven by a common feed motor 19.

The transportation mechanism for conveying the checks 4 delivered by the in-feed roller 13 through the check transportation path 5 includes a transportation motor 21, a drive roller 22 mounted on the rotating shaft of the transportation motor 21, a set of transportation rollers 31 to 37 disposed along the check transportation path 5, and a set of pressure rollers 41 to 46 and a second in-feed roller 47 that are pressed against and rotation with the transportation rollers 31 to 37. Rotation of the second in-feed roller 47 is transferred through a transfer gear 48 to a first in-feed roller 49. An endless belt 23 transfers rotation of the transportation motor 21 to the transportation rollers 31 to 37.

The transportation rollers 31 to 34 are located at the upstream end, the middle, and the downstream part of the upstream-side transportation path portion 6 where the upstream-side transportation path portion 6 joins the curving transportation path portion 7. The transportation roller 35 is located at the downstream side of the curving transportation path portion 7. The transportation roller 36 is located in the middle of the downstream-side transportation path portion 8. The transportation roller 37 is located before the second check storage unit 12, and the first in-feed roller 49 is located before the first check storage unit 11.

A magnet 51 for magnetizing the magnetic ink characters is disposed between the transportation rollers 31 and 32 in the upstream-side transportation path portion 6. A front contact image sensor 52 is disposed as the front image scanner, and a back contact image sensor 53 is disposed as a back image scanner, between the transportation rollers 32 and 33. A magnetic head 54 for magnetic ink character reading is disposed between transportation rollers 33 and 34.

A print mechanism 56 is disposed on the downstream side of the transportation roller 36 in the downstream-side transportation path portion 8. The print mechanism 56 can move between a printing position applying pressure to the check 4 and a standby position retracted from this printing position by means of a drive motor (not shown in the figure). The print mechanism 56 can also be rendered as a stamp mechanism that is pushed by a plunger to print (stamp) the check 4.

A flapper 66 that is driven by a drive motor not shown to switch the discharge path is disposed where the diversion paths 10*a* and 10*b* branch from the downstream end of the downstream-side transportation path portion 8. The checks 4 are discharged into either the first or second check storage unit 11 or 12 by the flapper 66.

Check Processing Operation

Processing checks 4 by the check processing apparatus 1 is described next. The checks 4 loaded in the check insertion unit 9 are delivered by the in-feed roller 13 into the check in-feed path 15, and fed from there one at a time into the upstream-side transportation path portion 6 of the check transportation path 5. The front and back surfaces of the check 4 advanced into the upstream-side transportation path portion 6 are imaged by the front contact image sensor 52 and back contact image sensor 53 as the check 4 travels passed. The magnetic ink characters are then read by the magnetic head 54.

If the check 4 is read correctly by the front contact image sensor 52, the back contact image sensor 53, and the magnetic head 54, ELECTRONIC FUNDS TRANSFER or other text is printed on the front surface by the print mechanism 56 disposed to the downstream-side transportation path portion 8, and the check 4 is then guided by the flapper 66 and discharged into the first check storage unit 11 of the check storage device 10. If the check 4 is not read correctly, nothing is printed by the print mechanism 56 and the flapper 66 directs the check 4 into the second check storage unit 12 of the check storage device 10.

Check Storage Apparatus

Figure 3:
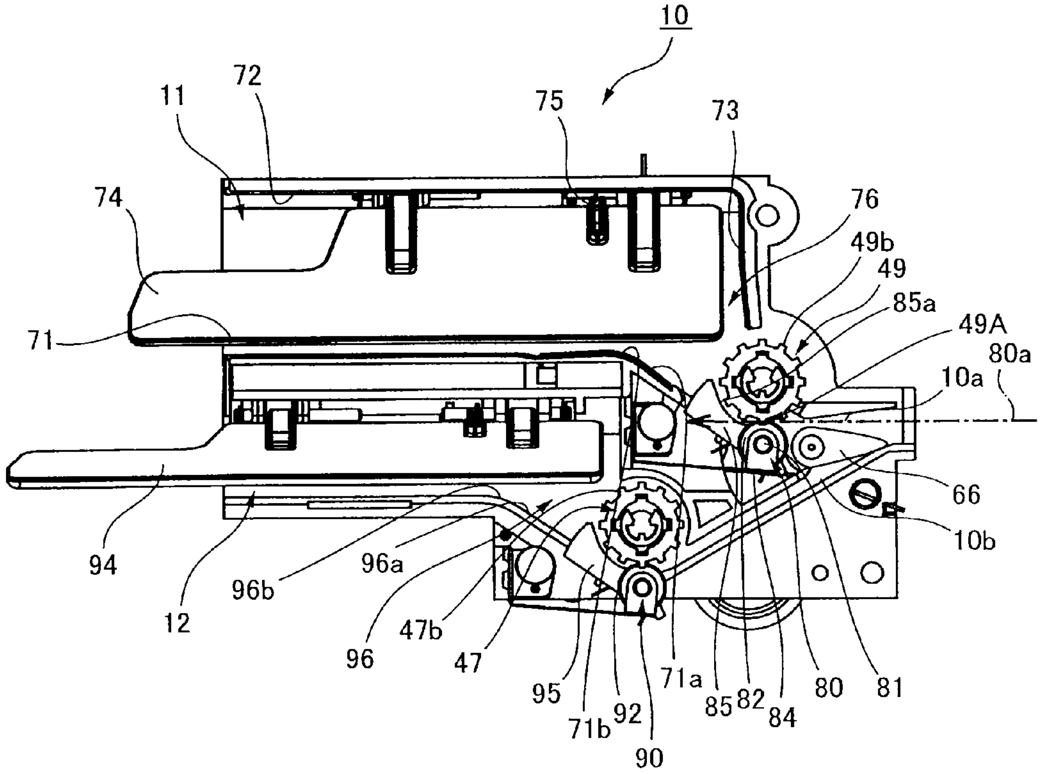
FIG. 3 is a plan view of the check storage apparatus.
Figure 4A:
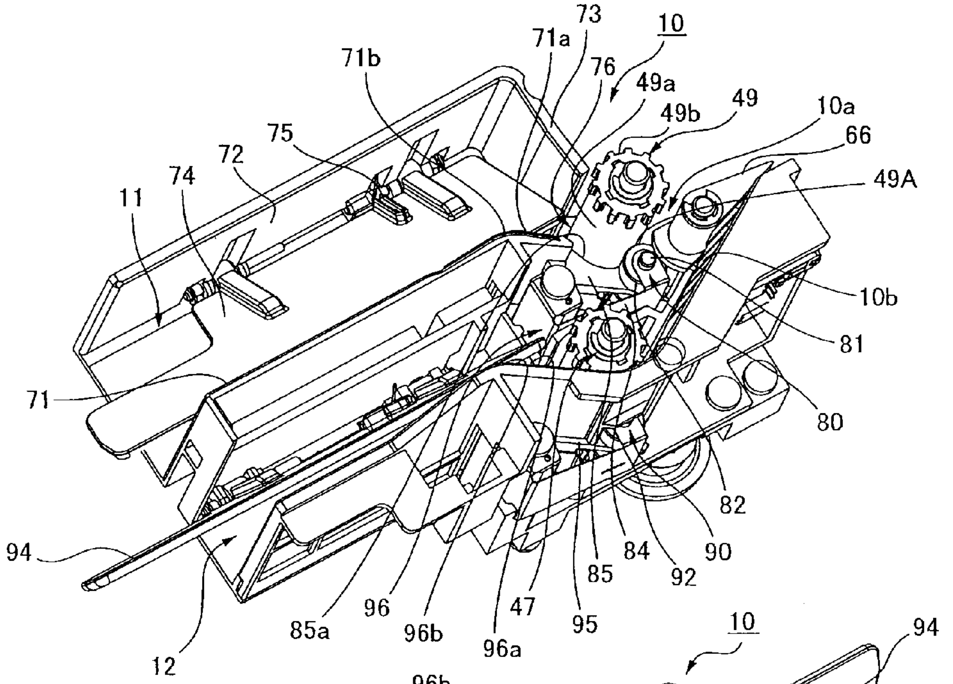
FIG. 4A is a perspective view of the check storage apparatus from the back.
Figure 4B:
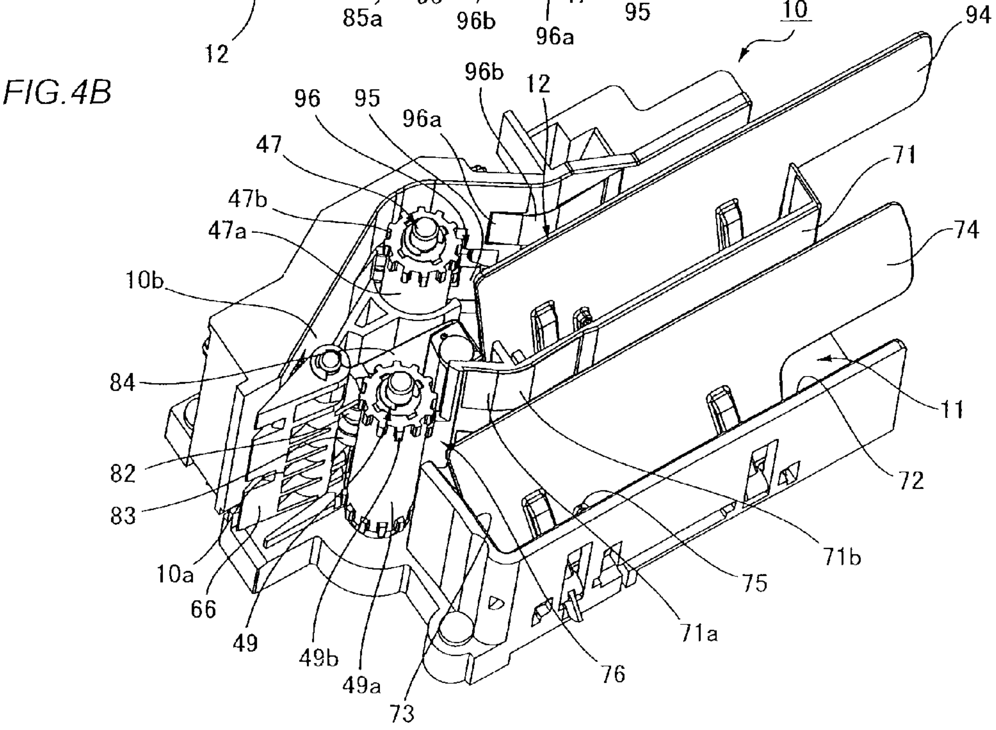
FIG. 4B is a perspective view of the check storage apparatus from the side.
Figure 5:
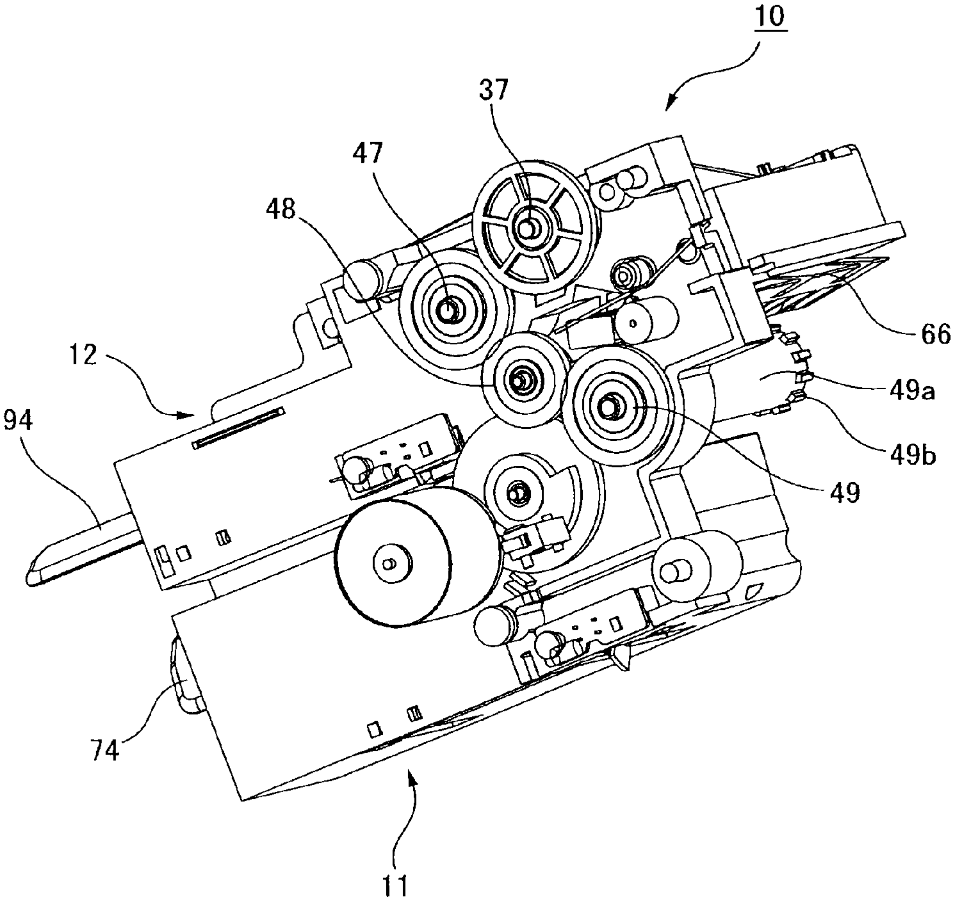
FIG. 5 is a perspective view of the check storage apparatus from the bottom.

FIG. 3, FIG. 4A, FIG. 4B, and FIG. 5 show the check storage device 10 in the check processing apparatus 1. FIG. 3 is a plan view of the check storage device 10, FIG. 4A is a perspective view of the check storage device 10 from the front of the check processing apparatus 1, FIG. 4B is a perspective view from the check in-feed end of the check storage device 10, and FIG. 5 is a perspective view from the bottom of the check storage device 10.

The check storage device 10 includes the first and second check storage units 11 and 12 that are connected through the diversion paths 10*a* and 10*b* to the downstream-side transportation path portion 8, the flapper 66, the first in-feed roller 49, and the second in-feed roller 47. The first in-feed roller 49 delivers checks 4 through one diversion path 10*a* into the first check storage unit 11. The second in-feed roller 47 delivers checks 4 through the other diversion path 10*b* into the second check storage unit 12. The second in-feed roller 47 is pressured by and rotates in conjunction with the transportation roller 37, and rotation of the second in-feed roller 47 is transmitted by the transfer gear 48 to the first in-feed roller 49.

The first check storage unit 11 has a long, narrow box-like shape that is open at the top and front, and has a first storage unit side wall 71 and a second storage unit side wall 72 on the right and left sides separated by a constant gap, and a back wall 73. A check inlet 76 through which the checks 4 are delivered is formed between the inside first storage unit side wall 71 and the back wall 73. A rectangular pressure plate 74 (media pressure member) for pressing the received checks 4 to the first storage unit side wall 71 is disposed between the right and left first and second storage unit side walls 71 and 72. The pressure plate 74 is made of plastic, for example, and is constantly pushed toward the first storage unit side wall 71 by the urging force of a torsion spring 75 attached to the bottom end part.

The first in-feed roller 49 is located before the check inlet 76 to the first check storage unit 11. The first in-feed roller 49 has a roller body 49*a* and coaxial gear portions 49*b* (radial protrusions). The gear portions 49*b* are formed at both ends of and are larger in diameter than the roller body 49*a*. A pressure roller 80 is pressed against and rotates in conjunction with the roller body 49*a* at the middle part in the axial direction.

Figure 6A:
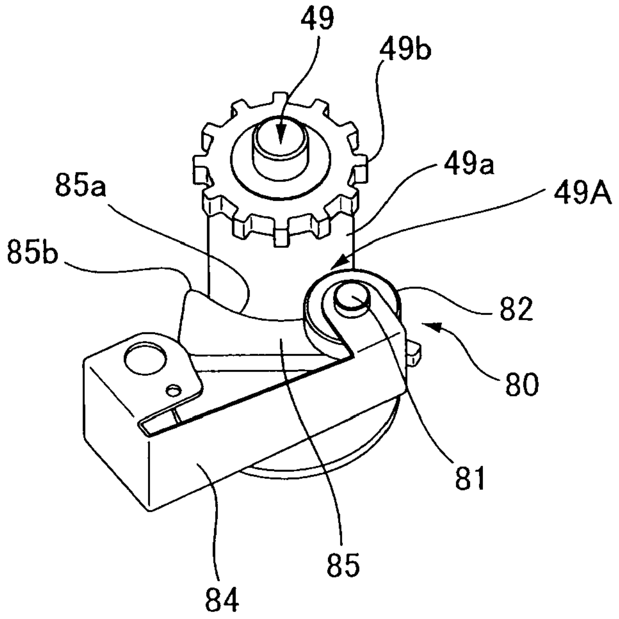
FIG. 6A is a perspective view showing a first in-feed roller and a pressure roller.
Figure 6B:
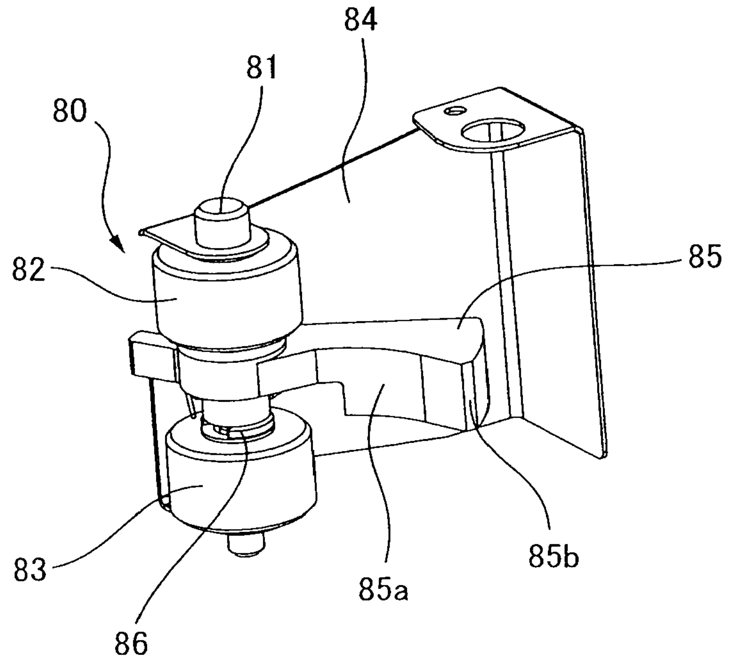
FIG. 6B is a perspective view of the pressure roller.

FIG. 6A is a perspective view of the first in-feed roller 49 and the pressure roller 80, and FIG. 6B is a perspective view of just the pressure roller 80. As shown in these figures the pressure roller 80 has an axle 81 and two small diameter rollers 82 and 83 attached coaxially to the axle 81 with a specific gap therebetween. The top and bottom ends of the axle 81 are supported by a support plate 84, which is rendered from a flat spring. The support plate 84 presses the small diameter rollers 82 and 83 to the roller body 49*a*. The two small diameter rollers 82 and 83 have the same diameter, and this diameter is smaller than the diameter of the roller body

Figure 8:
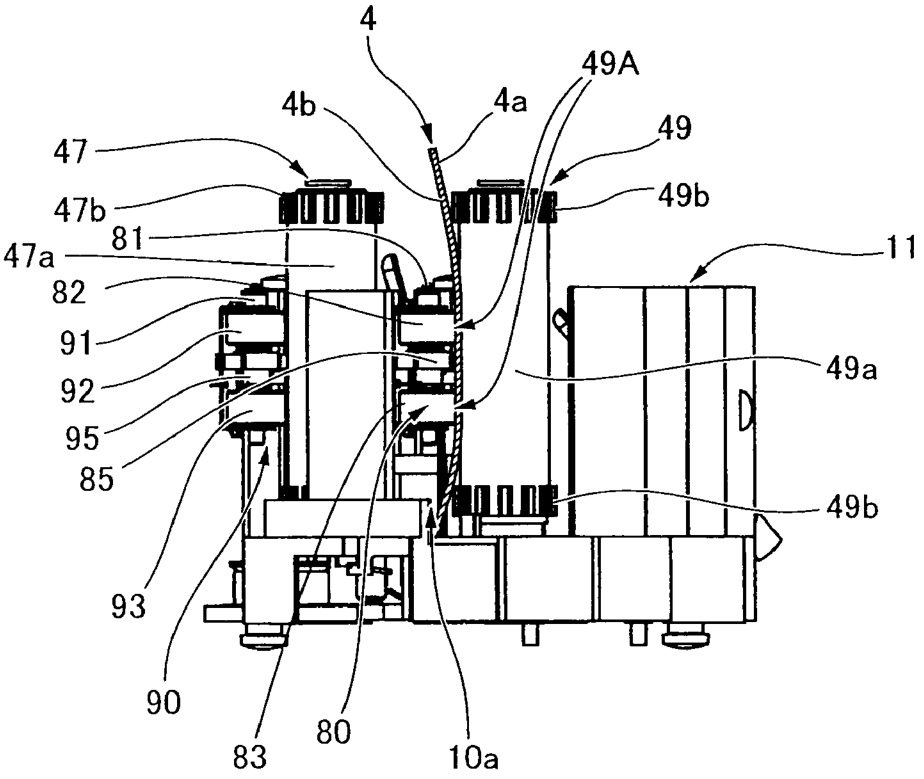
FIG. 8 is a front view of the check storage apparatus from the check in-feed side.

49*a* of the first in-feed roller 49. The distance between the top and bottom outside ends of the small diameter rollers 82 and 83 is shorter than the roller body 49*a*. This causes the checks 4 to be curved when seen from the end as shown in FIG. 8 and conveyed stably.

A first pressure member 85 is disposed between the two small diameter rollers 82 and 83 so that the first pressure member 85 can pivot on the axle 81 to and away from the first in-feed roller 49. This first pressure member 85 has a pressure surface 85*a* with a concavely curving profile corresponding to the outside surface of the roller body 49*a*. The pressure surface 85*a* opposes the outside surface of the roller body 49*a* through an approximately 90° angular range from the check nipping position 49A of the first in-feed roller 49 and the pressure roller 80. A first urging member 86 urges this first pressure member 85 toward the first in-feed roller 49. The first urging member 86 is a torsion spring attached to the axle 81 of the pressure roller 80.

The first storage unit side wall 71 inside the first check storage unit 11 is on the first in-feed roller 49 side of the nipping position 49A of the first in-feed roller 49 and pressure roller 80, and extends downstream parallel to the check feeding direction 80*a* of the rollers 49 and 80. A diagonal guide surface 71*a* formed between the first storage unit side wall 71 and the nipping position 49A guides check 4 fed passed the nipping position 49A to the first storage unit side wall 71.

Figure 7:
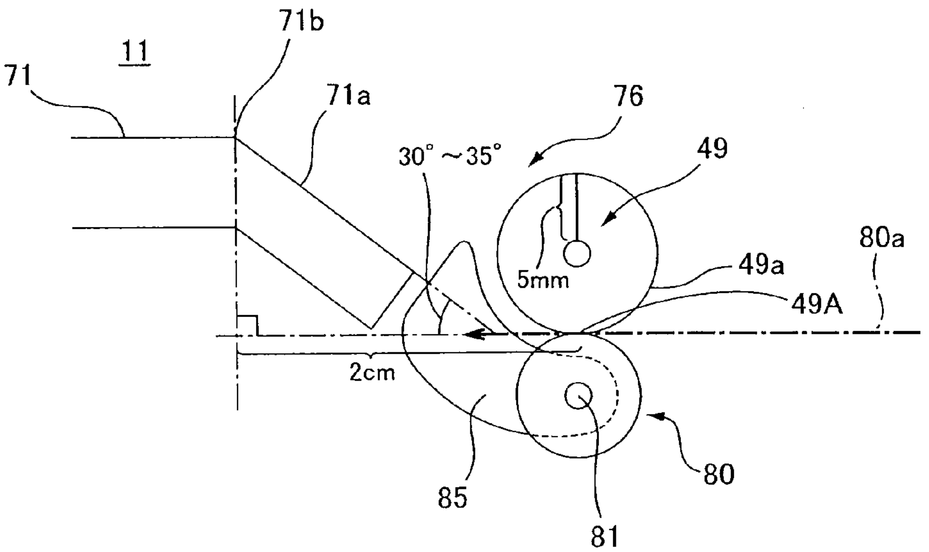
FIG. 7 schematically describes the relative positions of a vertical side wall, a diagonal guide wall, and a check in-feed position.

FIG. 7 schematically describes the relative positions of the first storage unit side wall 71, the diagonal guide surface 71*a*, and the nipping position 49A. As shown in the figure the diagonal guide surface 71*a* is inclined at an angle of approximately 30° to 35° to the check feeding direction 80*a*.

The shorter the distance from the nipping position 49A to the corner 71*b* where the diagonal guide surface 71*a* and the first storage unit side wall 71 intersect, the greater the bending load on the check 4 as it passes the corner 71*b*. For example, if the radius of the roller body 49*a* is approximately 5 mm and the slope of the diagonal guide surface 71*a* is approximately 30° to 35°, the distance from the nipping position 49A to the corner 71*b* is preferably a short approximately 2 cm to increase the bending load of the check 4 being conveyed.

The basic construction of the second check storage unit 12 is the same as the first check storage unit 11. More specifically, the second check storage unit 12 has an internal pressure plate 94, a check inlet 96 is formed at the upstream end in the check transportation direction, and the second in-feed roller 47 is disposed before the check inlet 96. The second in-feed roller 47 has a roller body 47*a* and gear portions 47*b*. A pressure roller 90 is pressed against the roller body 49*a*. The pressure roller 90 has an axle 91 and two small diameter rollers 92 and 93 attached coaxially to the top and bottom ends of the axle 91. A first pressure member 95 is disposed between the two small diameter rollers 92 and 93. A diagonal guide surface 96*a* having a corner 96*b* is formed at the check inlet 96.

The pressure plate 94, the second in-feed roller 47, the pressure roller 90, the first pressure member 95, and the diagonal guide surface 96*a* are identical to the pressure plate 74, the first in-feed roller 49, the pressure roller 80, the first pressure member 85, and the diagonal guide surface 71*a* of the first check storage unit 11, and further description thereof is thus omitted.

Check Storage Operation

FIG. 8 is a frontal view of the check storage device 10 during the check conveying operation from the in-feed side in the direction of check transportation, and FIG. 9A to FIG. 9D are plan views of the check storage device 10 during the check conveying operation. The operation for feeding a check 4 into the first check storage unit 11 and the check discharge operation into the second check storage unit 12 are the same, and only the operation for feeding checks into the first check storage unit 11 is therefore described below.

When a check 4 is conveyed to the diversion path 10*a*, the check 4 is nipped between the rotating first in-feed roller 49 and pressure roller 80, and the check 4 is fed toward the first check storage unit 11. When the check 4 is thus nipped, the pressure roller 80 presses the middle of the back 4*b* of the check 4 against the roller body 49*a*, causing the top and bottom edges of the check front 4*a* to contact the gear portions 49*b* and the check to bend so that the top and bottom edges point away from the outside surface of the roller body 49*a*. As a result, as shown in FIG. 8, the middle part of the check 4 curves laterally to the top and bottom edges. This increases the rigidity in the out-of-plane direction so that the check 4 becomes stiffer and is conveyed with greater resistance to bending.

Figure 9A:
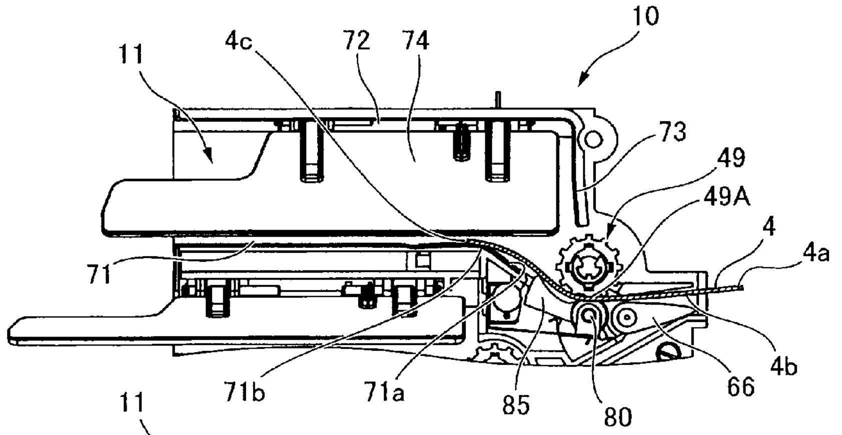
FIG. 9A is a plan view of the check storage apparatus showing the check in-feed operation.

When the check 4 is conveyed with this out-of-plane curvature into the first check storage unit 11, the leading end part 4*c* is guided along the diagonal guide surface 71*a* and advances diagonally to the check feeding direction 80*a*. As shown in FIG. 9A, the back 4*b* of the check 4 slides along the corner 71*b* of the diagonal guide surface 71*a* and is supported from the side by the corner 71*b* as the check 4 pushes the pressure plate 74 back and slides between the pressure plate 74 and the first storage unit side wall 71.

Figure 9B:
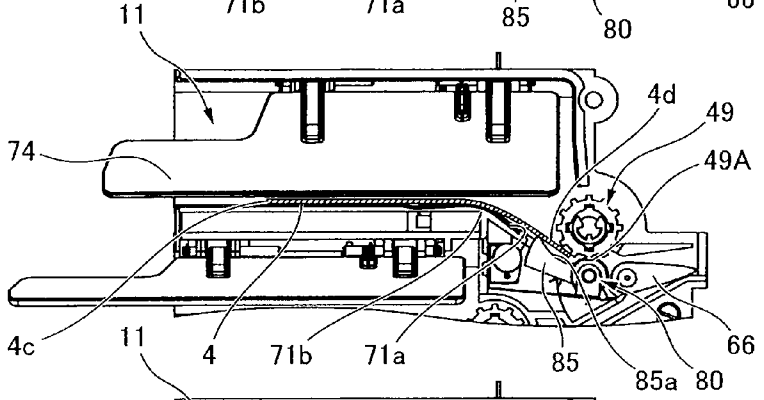
FIG. 9B is a plan view of the check storage apparatus showing the check in-feed operation.
Figure 9C:
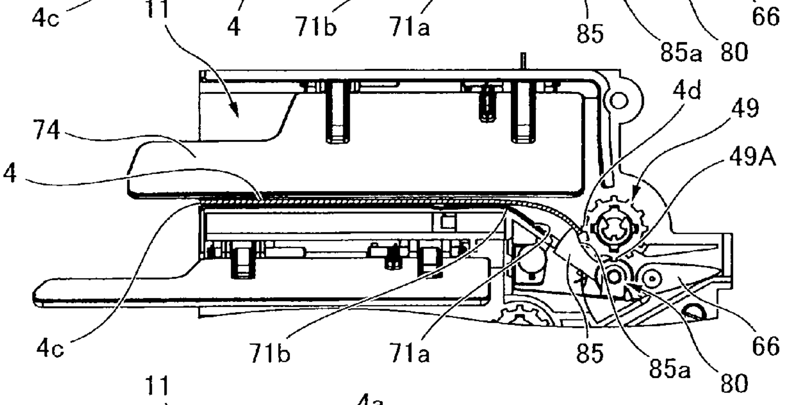
FIG. 9C is a plan view of the check storage apparatus showing the check in-feed operation.
Figure 9D:
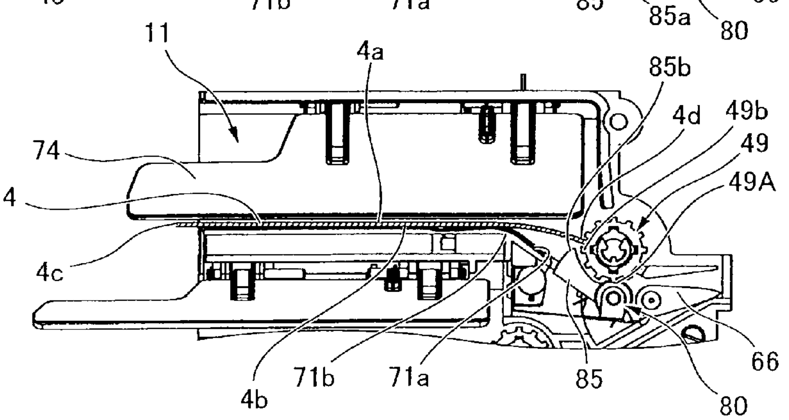
FIG. 9D is a plan view of the check storage apparatus showing the check in-feed operation.

After the trailing end 4*d* passes the nipping position 49A of the first in-feed roller 49 and pressure roller 80, the trailing end 4*d* of the check 4 is pressed to the first in-feed roller 49 by the first pressure member 85 as shown in FIG. 9B. The trailing end 4*d* of the check 4 therefore does not separate from the gear portions 49*b* at both ends of the first in-feed roller 49. This enables the first in-feed roller 49 to reliably advance the check 4 into the first check storage unit 11 as shown in FIG. 9C and FIG. 9D.

As described above the trailing end 4*d* of the check 4 is pressed by the first pressure member 85 to the first in-feed roller 49 even after the check 4 has passed the nipping position 49A of the first in-feed roller 49 and pressure roller 80. Advancing the check 4 therefore continues uninterrupted. When check transportation ends, the trailing end 4*d* of the check 4 is moved to the side by the first pressure member 85 and the rotating gear portions 49*b*. This prevents becoming unable to feed the next check 4 into the first check storage unit 11 as a result of the leading end part 4*c* of the next check 4 colliding with the trailing end 4*d* of the check 4 stored in the first check storage unit 11.

Furthermore, because the check 4 is curved in the out-of-plane direction when the first in-feed roller 49 and the pressure roller 80 feed the check 4 into the first check storage unit 11, the check 4 being conveyed is stiffened and becomes more resistant to being bent. The check 4 can thus be reliably conveyed to the storage position between the first storage unit side wall 71 and the pressure plate 74.

Furthermore, because the check 4 is guided by the diagonal guide surface 71*a* and fed diagonally into the first check storage unit 11, the check 4 can be advanced reliably without the leading end of the check 4 colliding with the trailing end of a previously stored check.

With the check processing apparatus according to this first embodiment of the invention, a first pressure member pushes the check to the in-feed roller even after the check finishes passing the nipping position of the in-feed roller and the pressure roller. The trailing end part of the check will therefore not separate laterally from the in-feed roller even if a load is applied to the check in the direction obstructing check advancement. The checks are therefore reliably fed into the check storage unit by the in-feed roller. The leading end of a following check can therefore be prevented from colliding with the trailing end part of a check already completely stored inside the check storage unit, or the trailing end part of a check that curved sideways when being fed into the storage unit, and being unable to feed a following check into the check storage unit can be dependably prevented.

Embodiment 2

A check processing apparatus according to a second embodiment of the invention is described next with reference to FIG. 10 to FIG. 16.

Figure 10A:
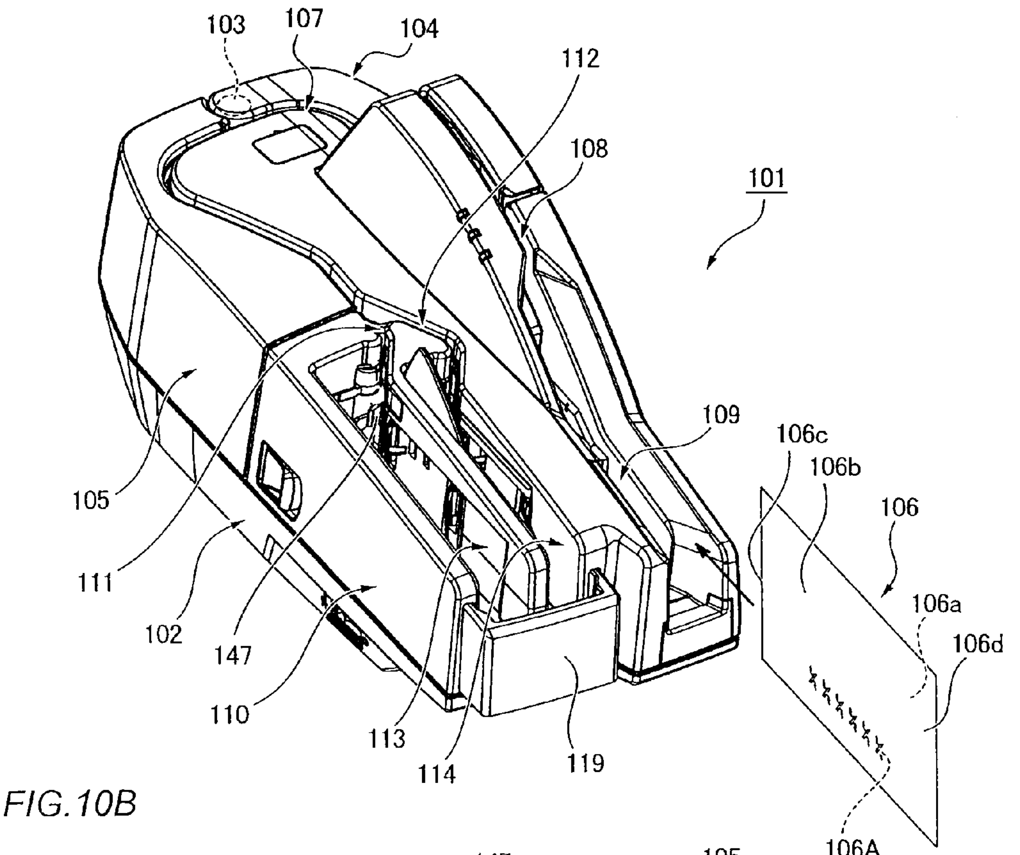
FIG. 10A is a perspective view of a check processing apparatus according to a second embodiment of the invention.
Figure 10B:
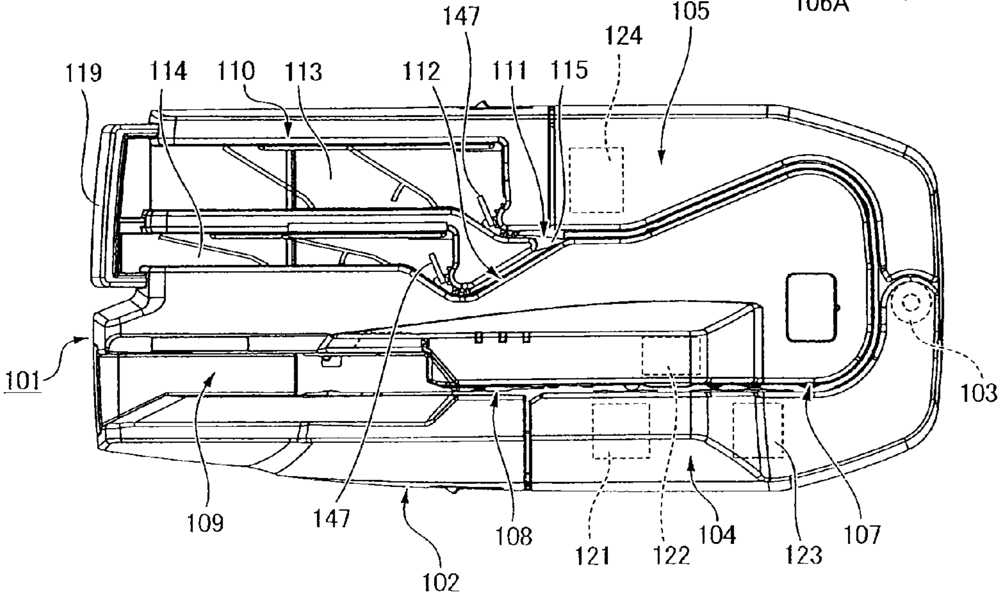
FIG. 10B is a plan view of the check processing apparatus shown in FIG. 10A.

FIG. 10A and FIG. 10B are a perspective view and a plan view, respectively, of a check processing apparatus according to a second embodiment of the invention. This check processing apparatus 101 has a main case 102 on the base and openable covers 104 and 105 that can open and close to the right and left pivoting on a vertical shaft 103 installed to an end part of the main case 102. A check transportation path 107 for conveying checks 106 is formed between the main case 102 and the openable covers 104 and 105.

The check transportation path 107 is defined by a narrow vertical slot that extends curving in substantially a U-shaped path when seen from above. The upstream end of the check transportation path 107 in the check transportation direction is connected through a check feeding channel 108, which is a narrow vertical slot, to a check supply unit 109, which is a wide vertical slot. The downstream end of the check transportation path 107 is connected to a check storage device 110.

The check storage device 110 has first and second diversion paths 111 and 112, which are narrow vertical channels connected to the downstream end of the check transportation path 107, a first check storage unit 113 and a second storage unit 114 that are connected to the downstream ends of the diversion paths. A flapper 115 disposed where the first and second diversion paths 111 and 112 diverge directs the checks 106 discharged from the check transportation path 107 into the first or the second check storage unit.

As shown in FIG. 10A the checks 106 have a magnetic ink character line 106A printed lengthwise along the bottom edge part of the check front 106*a*. The check amount, payer, check number, and signature are also recorded on the check front 106*a* against a specific background pattern, and an endorsement line is provided on the check back 106*b*. The checks 106 are inserted to the check supply unit 109 with the tops and bottoms aligned and the check front 106*a* facing the outside of the U-shaped check transportation path 107.

As indicated by the dotted lines in FIG. 10B, a front contact image scanner 121 for imaging the front surface of the checks 106, a back contact image scanner 122 for imaging the back surface of the check 6, a magnetic head 123 for reading magnetic ink characters, and a printing mechanism 124 for printing ELECTRONIC FUNDS TRANSFER, for example, on the check front are disposed in this order along the check transportation path 107.

After a check 106 is delivered from the check supply unit 109 through the check feeding channel 108, the front and back sides of the check 106 are imaged and the magnetic ink character line 106A printed on the check front 106*a* is read as the check 106 travels through the check transportation path 107. If the information is read correctly, ELECTRONIC FUNDS TRANSFER or other information is printed on the check 106, and the check 106 is delivered to and stored in the first check storage unit 113. Checks 106 that cannot be scanned or read correctly are not printed and are diverted to and stored in the second check storage unit 114.

The internal arrangement and check processing operation of this check processing apparatus 101 are the same as in the check processing apparatus 1 of the first embodiment described above and shown in FIG. 2, and further description thereof is thus omitted.

Check Storage Apparatus

Figure 11:
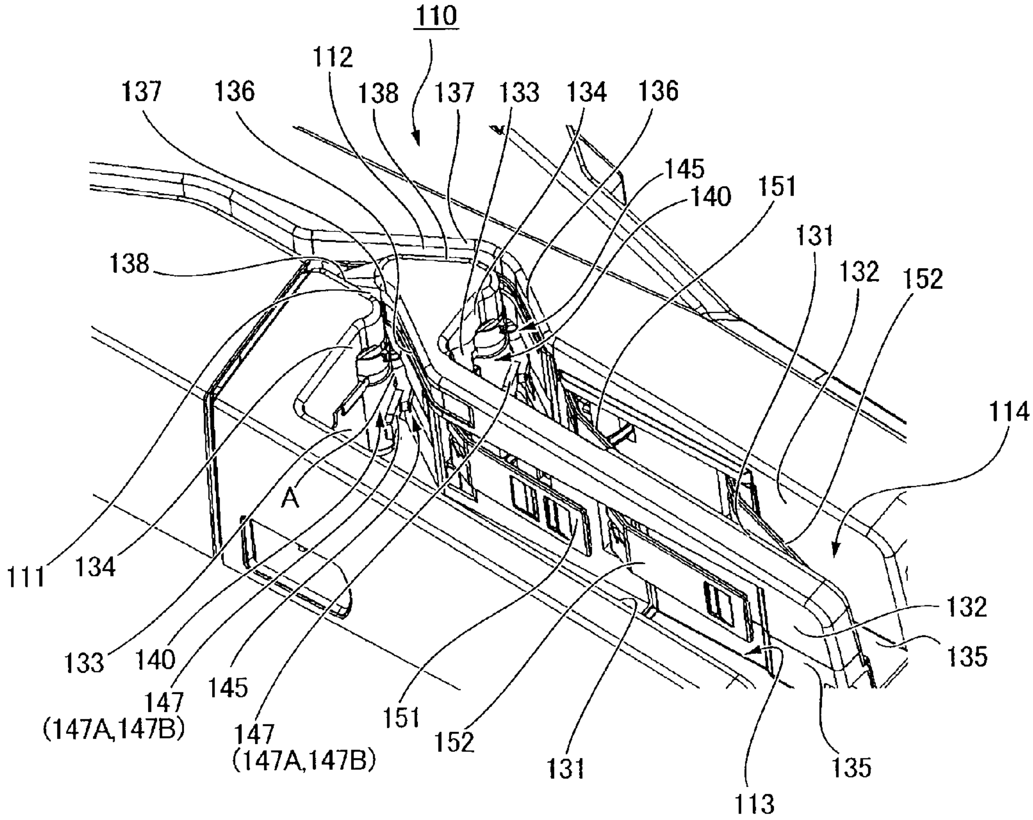
FIG. 11 is a perspective view showing the check storage unit of the check processing apparatus.

FIG. 11 is a perspective view of the check storage device 110 in the check processing apparatus 101.

The check storage device 110 has a first diversion path 111, a second diversion path 112, and first and second check storage units 113 and 114 that are connected through the downstream ends of the first and second diversion paths 111 and 112. The first and second check storage units 113 and 114 are identical, and only the first check storage unit 113 is therefore described below. Like parts in the second check storage unit 114 are identified by the same reference numerals, and further description thereof is omitted below.

The first check storage unit 113 is a rectangular slot of a prescribed depth that is long front to back, and has parallel left and right storage unit side walls 131 and 132, a bottom 135, and an inside end wall 133. A diagonal guide wall 136 is formed from the inside end part of the right-side first storage unit side wall 132 with the distance between the diagonal guide wall 136 and the left-side second storage unit side wall 131 increasing toward the inside end wall 133, that is, decreasing from the upstream end to the downstream end. The upstream end of the diagonal guide wall 136 communicates with one inside wall 137 of the first diversion path 111.

An in-feed roller 140 for feeding checks 106 into the first check storage unit 113 is disposed beside the diagonal guide wall 136 of the inside end wall 133. A pressure roller 145 for pressing the check 106 to the in-feed roller 140 protrudes from the one inside wall 137 of the first diversion path 111 opposite the in-feed roller 140. A pressure member 147 having a first pressure member 147A and a second pressure member 147B rendered in unison is disposed to the pressure roller 145. The first pressure member 147A has the same function as the first pressure member 85 in the first embodiment of the invention. The second pressure member 147B pushes the trailing end part 106*d* of the check 106 fed into the first check storage unit 113 passed the check nipping position A of the in-feed roller 140 and the pressure roller 145 to the second storage unit side wall 131.

Two pressure plates 151 and 152 (media pressure members) are disposed inside the first check storage unit 113. These pressure plates 151 and 152 guide checks 106 being conveyed by the in-feed roller 140 and the pressure roller 145 toward the second storage unit side wall 131, and press the conveyed checks 106 to the second storage unit side wall 131 and hold the checks 106 in an upright position. The pressure plates 151 and 152 are attached to the first storage unit side wall 132 inclining at a prescribed angle to the front toward the second storage unit side wall 131. The pressure plates 151 and 152 pivot on the end part at the first storage unit side wall 132 so that the distal end moves toward and away from the second storage unit side wall 131.

Figure 12A:
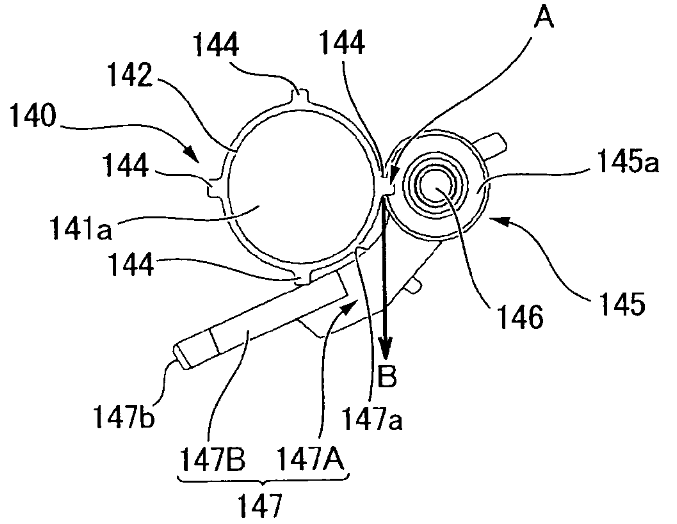
FIG. 12A is a plan view of the in-feed roller, pressure roller, and second pressure member.
Figure 12B:
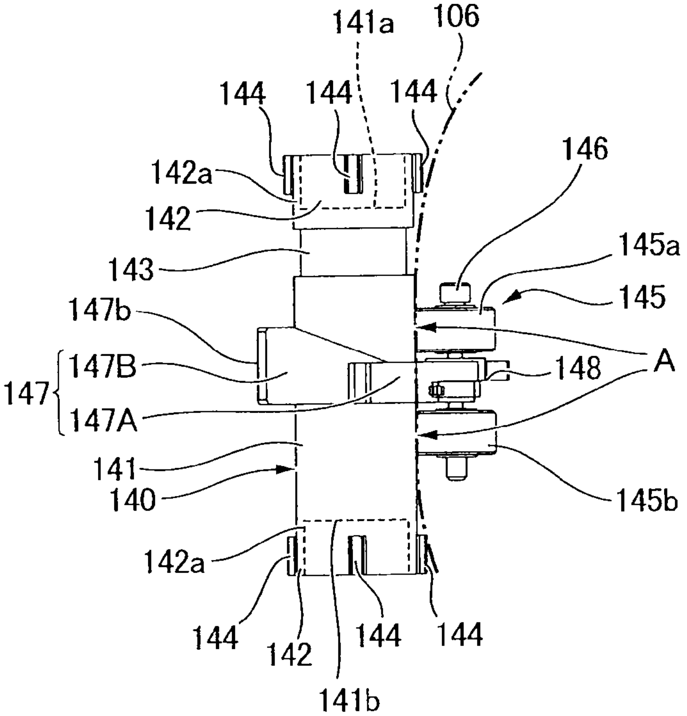
FIG. 12B is a side view of the in-feed roller, pressure roller, and second pressure member.

FIG. 12A and FIG. 12B show the in-feed roller 140, the pressure roller 145, and the pressure member 147. As shown in the figures, the in-feed roller 140 includes a roller body 141, a cylindrical portion 142, and a small diameter portion 143. The cylindrical portion 142 extends coaxially from both ends of the roller body 141, and has the same outside diameter as the roller body 141. The small diameter portion 143 is formed coaxially to the roller body 141, and has a smaller diameter than the roller body 141. The in-feed roller 140 is a unimorphous molding made of rubber or other elastic material. Four protrusions 144 are formed on the cylindrical portion 142 projecting radially from the outside surface. These four protrusions 144 are rendered at equal intervals around the circumference. These protrusions 144 are formed projecting to the outside from the axial ends 141*a* and 141*b* of the roller body 141. Between the protrusions 144 and the roller body 141 is a thin-wall annular part 142*a*. The small diameter portion 143 is formed near the top end 141*a* between the axial ends 141*a* and 141*b* of the roller body 141.

The pressure roller 145 has an axle 146 and two pressure rollers 145*a* and 145*b* that are disposed with a gap therebetween coaxially to the axle 146. The pressure rollers 145*a* and 145*b* have the same diameter, which is smaller than the diameter of the roller body 141 of the in-feed roller 140. The distance between the top and bottom outside ends of the pressure rollers 145*a* and 145*b* is shorter than the roller length of the roller body 141 of the in-feed roller 140. The two pressure rollers 145*a* and 145*b* are pressed elastically between the axial ends 141*a* and 141*b* of the roller body 141.

The pressure member 147 is attached to the axle 146 between the two pressure rollers 145*a* and 145*b* so that the pressure member 147 can pivot toward and away from the in-feed roller 140 and the second storage unit side wall 131 on the axle 146. The first pressure member 147A of the pressure member 147 is pivotably attached to the axle 146, and the second pressure member 147B is formed in unison with the distal end part of the first pressure member 147A. An urging member 148 (second urging member), which is a torsion spring in this embodiment of the invention, disposed to the axle 146 urges this pressure member 147 to the in-feed roller 140 and the second storage unit side wall 131.

The pressure member 147 also has a pressure surface 147A with a concavely curving profile corresponding to the outside surface of the roller body 141. The pressure surface 147A opposes the outside surface of the roller body 141 through an approximately 90° angular range from the nipping position A of the first in-feed roller 140 and the pressure roller 145.

FIG. 12A and FIG. 12B show these parts when a check 106 is not in the nipping position A between the in-feed roller 140 and the pressure roller 145. At this time the pressure surface 147*a* of the first pressure member 147A on the pivot axis side of the pressure member 147 touches the outside surface of the roller body 141 of the in-feed roller 140. The pivoting distal end of the pressure member 147, that is, the distal end 147*b* of the second pressure member 147B, is positioned closest to the second storage unit side wall 131, and this distal end 147*b* projects beyond the in-feed roller 140 toward the second storage unit side wall 131.

In-Feed Roller Function

The function of the in-feed roller 140 is described next.

Protrusions 144 are formed on the cylindrical portions 142 at both ends of the in-feed roller 140, and the pressure roller 145 presses the check 106 delivered into the first check storage unit 113 against the roller body 141 between these cylindrical portions 142. Checks 106 that are made from thin stock, particularly pliable stock, or wrinkled are thus fed into the first check storage unit 113 with the middle of the check bowed laterally away from the top and bottom edges as indicated by the double-dot dash line in FIG. 12B. This increases the out-of-plane stiffness of the check 106. By thus increasing the stiffness of the in-fed check 106, the check 106 will not deflect in the direction of transportation.

On the other hand, when checks 106 that are relatively stiff, such as checks made from heavy stock and brand-new checks, are advanced by the in-feed roller pair, the thin-walled annular part 142*a* between the protrusions 144 and the roller body 141 deflects to the inside. The protrusions 144 thus retreat to the inside radially, and stiff checks 106 are not forcibly curved.

Figure 13A:
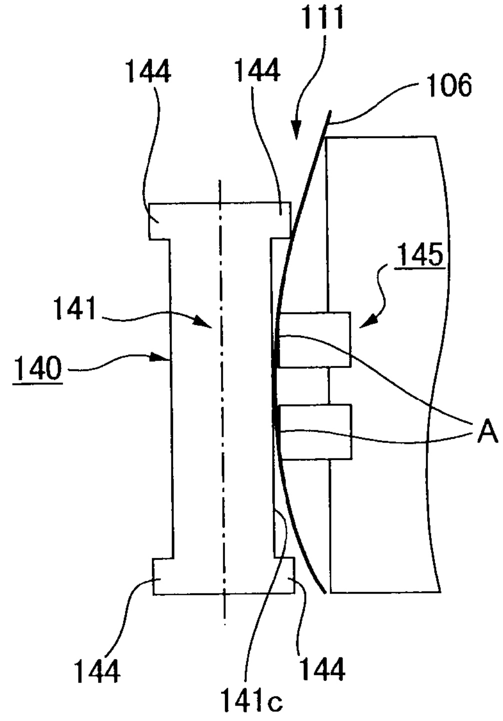
FIG. 13A describes the function of the in-feed roller.

This is further described with reference to FIG. 13A and FIG. 13B. When the protrusions 144 are formed at the outside circumference on both ends of the roller body 141 and a check 106 made of stiff stock passes the nipping position A, the protrusions 144 will not retreat radially to the inside as shown in FIG. 13A. As a result, the check 106 curves unconditionally. This curved part of the check 106 then slides with great stiffness along the first diversion path 111 and the inside wall of the first check storage unit 113, and an excessive transportation load is applied to the in-feed roller 140. A large sliding load also acts on the protrusions 144, thus increasing wear, and noise increases while conveying the forcibly curved check 106. In addition, if it becomes necessary to forcibly pull the check 106 held in the nipping position A out from the top, the protrusions 144 at the top end interfere and the check 106 cannot be easily removed.

Figure 13B:
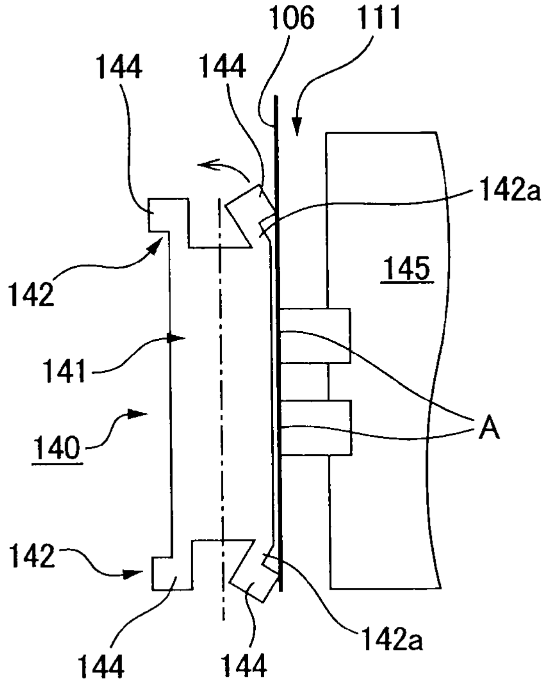
FIG. 13B describes the function of the in-feed roller.

However, if the protrusions 144 are formed to the cylindrical portion 142, the thin-wall annular part 142*a* between the protrusions 144 and the roller body 141 deflects to the inside, and the protrusions 144 retreat radially to the inside as shown in FIG. 13B. As a result, the check 106 is not forcibly curved.

Because the check 106 then does not slide with great force along the first diversion path 111 and the inside wall of the first check storage unit 113, an excessive feed load does not act on the in-feed roller 140. Wear on the protrusions 144 therefore does not increase, and noise from conveying the check 106 does not increase.

In addition, if it becomes necessary to pull the check 106 held in the nipping position A out from the top, the check 106 can be easily removed because the protrusions 144 at the top have retreated to a position near the outside circumference of the roller body 141.

When a check 106 made of weaker stock passes the nipping position when the protrusions 144 are disposed to the cylindrical portion 142, the protrusions 144 cause the check 106 to curve because the annular part 142*a* does not deflect to the inside. The check 106 is therefore curved as described above as it is advanced to the first check storage unit 113.

The thin-walled annular part 142*a* is between the protrusions 144 of the cylindrical portion 142 and the roller body 141 and deflects in this embodiment of the invention. However, if deflection to the inside is possible when a check 106 made of stiff stock passes the nipping position A, the protrusions 144 can be formed continuously to both ends of the roller body 141 and the annular part 142*a* can be omitted. The cylindrical portion 142 can be made thin in this case.

Check Storage Operation

Figure 14A:
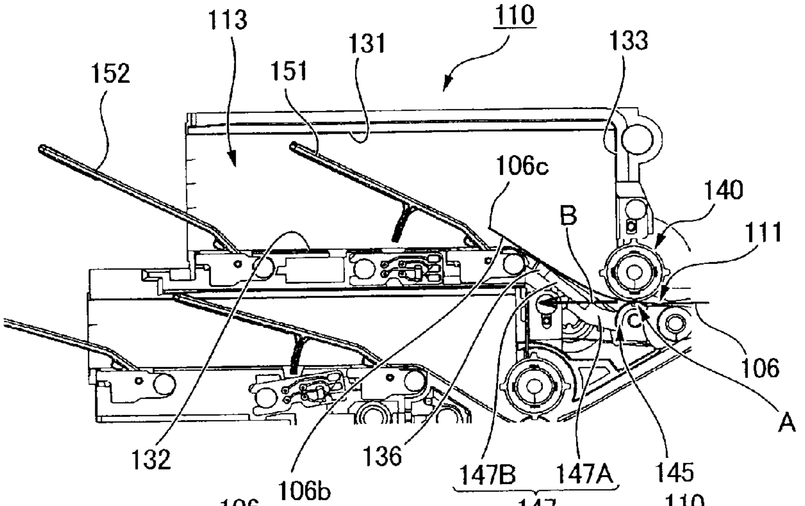
FIG. 14A describes the check in-feed operation.
Figure 14B:
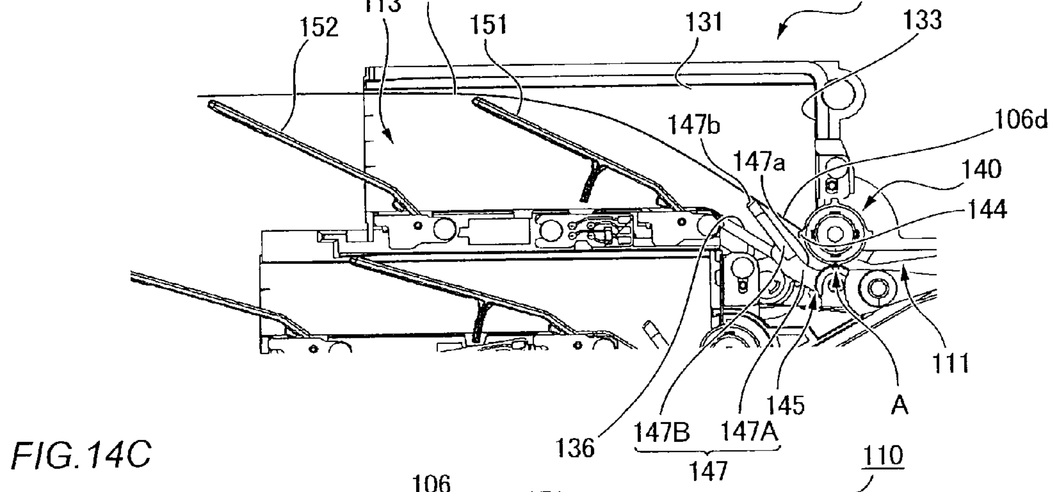
FIG. 14B describes the check in-feed operation.
Figure 14C:
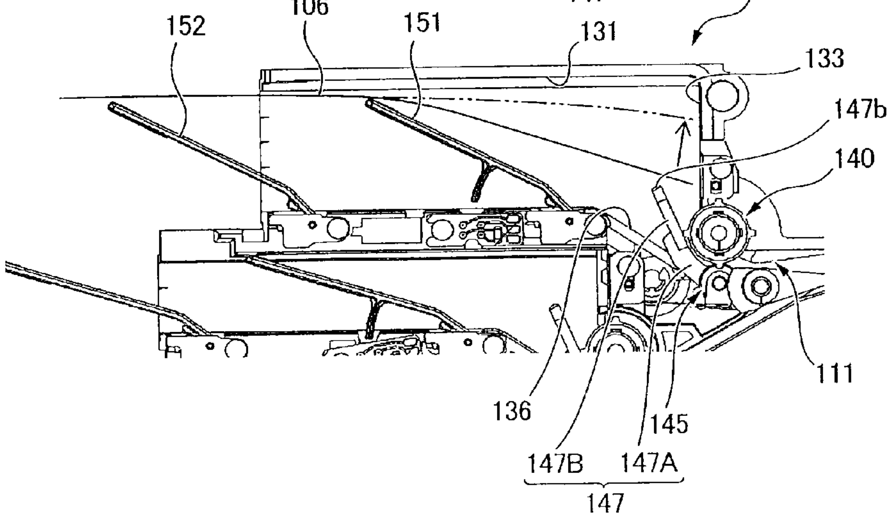
FIG. 14C describes the check in-feed operation.

FIG. 14A to FIG. 14C are plan views showing the check storage device 110 when feeding a check into the storage unit. The cover over the top of the pressure member 147 is removed in these figures so that the operation of the pressure member 147 can be seen.

When a check 106 is conveyed to the first diversion path 111, the check 106 is nipped by the in-feed roller 140 and pressure roller 145, and advanced toward the first check storage unit 113. If a check 106 with insufficient stiffness is conveyed, pressure applied between the in-feed roller 140 and pressure roller 145 causes the check 106 to deflect out-of-plane, thus stiffening the check 106 as the check 106 advances.

When the distal end part 106*c* of the check 106 passes the nipping position A, the distal end part 106*c* is guided by the diagonal guide wall 136 and advanced diagonally to the transportation direction B. As shown in FIG. 14A, the back 106*b* of the check 106 slides along the corner of the diagonal guide surface 136 as the check 106 advances toward the second storage unit side wall 131 inside the first check storage unit 113. The back 106*b* of the advancing check 106 slides along the pressure member 147 and pushes the pressure member 147 in transportation direction B. As a result, the pressure member 147 does not protrude from the diagonal guide wall 136 toward the second storage unit side wall 131.

While the check 106 is being advanced by the in-feed roller 140 and pressure roller 145, the check 106 entering the first check storage unit 113 is guided toward the second storage unit side wall 131 by the upright pressure plates 151 and 152.

When transportation of the check 106 by the in-feed roller 140 and pressure roller 145 ends, the protrusions 144 catch the trailing end of the check 106 immediately after entering the first check storage unit 113, and the in-feed roller 140 moves the trailing end part 106*d* from an extension of the transportation direction B at the nipping position A circumferentially in the direction of rotation of the in-feed roller 140. Because the trailing end part 106*d* of the check 106 is released from the nipping position A, the force of the back 106*b* of the check 106 pushing the pressure member 147 in the transportation direction B disappears. As a result, the pressure member 147 pivots, the pressure surface 147*a* of the first pressure member 147A on the pivot axis side is pushed in the direction approaching the outside surface of the roller body 141, and the second pressure member 147B is pushed from the diagonal guide wall 136 to the second storage unit side wall 131. The pressure plates 151 and 152 also push the check 106 to the second storage unit side wall 131.

Therefore, even after the trailing end part 106*d* of the check 106 passes the check nipping position A of the in-feed roller 140 and pressure roller 145, the first pressure member 147A presses the trailing end part 106*d* to the outside surface of the in-feed roller 140. The trailing end part 106*d* of the check 106 therefore cannot easily separate from the protrusions 144 at both ends of the in-feed roller 140. The check 106 is thus reliably fed into the first check storage unit 113 by the in-feed roller 140.

As shown in FIG. 14C when the distal end 147*b* of the second pressure member 147B pivots to the second storage unit side wall 131 from the in-feed roller 140, the trailing end part 106*d* of the check 106 is pushed toward the second storage unit side wall 131 and is stored in line with the second storage unit side wall 131. The checks 106 are thus stored stacked in order from the second storage unit side wall 131 of the first check storage unit 113.

The front end of the first and second check storage units 113 and 114 is defined by a drawer 119 that can be pulled out to the front of the check storage device 110 according to this embodiment of the invention. When the drawer 119 is pulled forward from the position shown in FIG. 10, the first and second check storage units 113 and 114 extend longitudinally. This enables also storing long checks 106.

Function of the Second Pressure Member

Figure 15A:
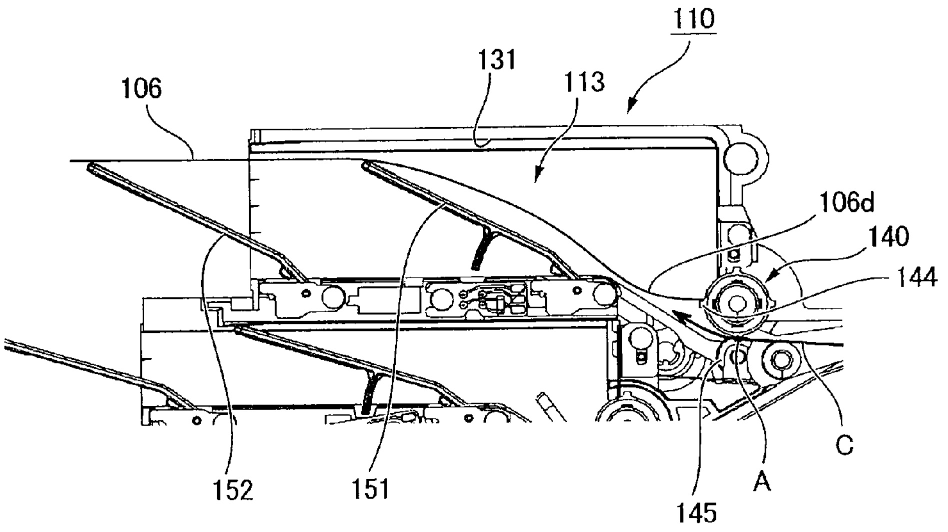
FIG. 15A describes conveying a check when the second pressure member is not present.
Figure 15B:
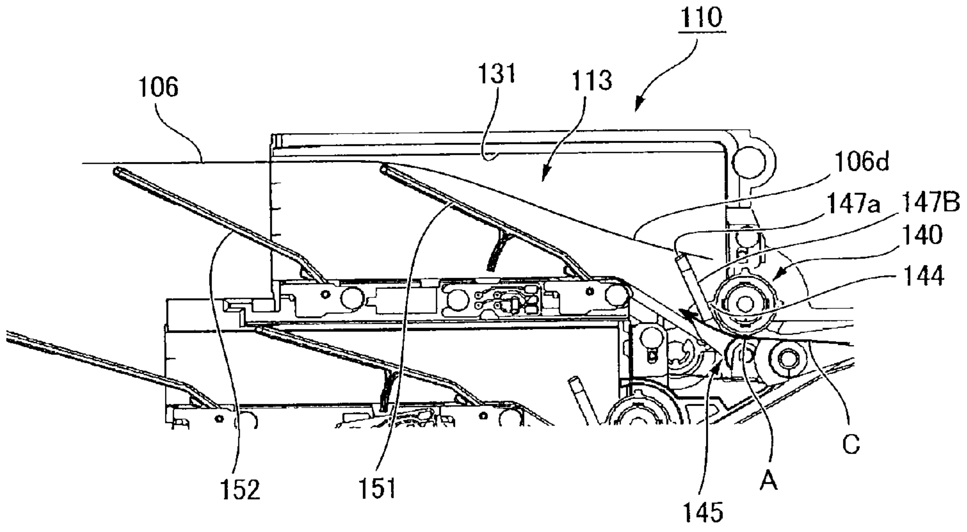
FIG. 15B describes conveying a check when the second pressure member is present.

FIG. 15A and FIG. 15B describe the function of the second pressure member 147B. FIG. 15A shows an arrangement in which the second pressure member 147B is not used, and FIG. 15B shows an arrangement in which the second pressure member 147B is used. Both figures show conveying a limp check 106 into the first check storage unit 113 when the check 106 is no longer fed by the in-feed roller 140 and pressure roller 145 and the trailing end part of the check is bending toward the in-feed roller 140.

Even when the second pressure member 147B is not present as shown in FIG. 16A, the protrusions 144 of the in-feed roller 140 move the position of the trailing end part 106*d* of the check 106 circumferentially to the in-feed roller 140. Because the trailing end part 106*d* of the check 106 cannot be moved passed the in-feed roller 140 to the second storage unit side wall 131, a path C for advancing the next check into the first check storage unit 113 cannot be dependably assured.

When the second pressure member 147B is present as shown in FIG. 15B, however, the trailing end part 106*d* of the check 106 moves passed the in-feed roller 140 to the second storage unit side wall 131 side in conjunction with movement of the distal end 147*b* of the second pressure member 147B. The trailing end part 106*d* of the check 106 is thus not left near the nipping position A, and a path C for the next check 106 fed into the first check storage unit 113 can be reliably assured. The next check will therefore not jam.

Furthermore, because the second pressure member 147B pushes the trailing end part 106*d* of the check 106 to the second storage unit side wall 131 side, if a check made of stiff or normal stock is fed next, the previously conveyed check 106 will be stored neatly stacked along the second storage unit side wall 131.

As described above the pressure member 147 has the second pressure member 147B formed in unison to the distal end part of the first pressure member 147A. Alternatively, however, the first pressure member 147A and the second pressure member 147B can be rendered separately and each could pivot independently of the other. In this case the pivot axis of the second pressure member 147B is not limited to the axle 146 of the pressure roller 145.

Figure 16:
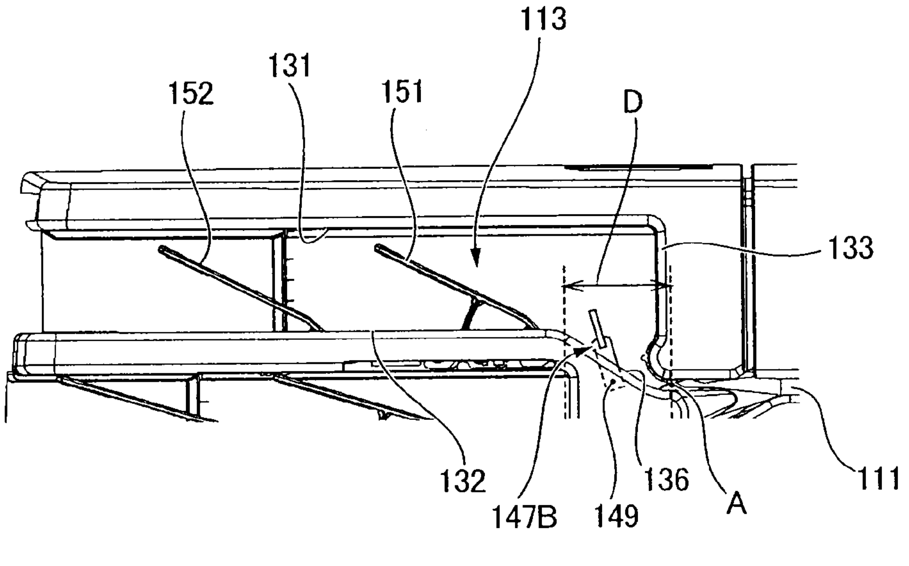
FIG. 16 describes the location of the pivot axis of the second pressure member.

FIG. 16 shows the range in which the pivot axis of the second pressure member 147B is desirably set. As shown in the figure the pivot axis 149 of the second pressure member 147B is preferably positioned longitudinally to the first check storage unit 113 in the range D from the nipping position A to the downstream end of the diagonal guide wall 136.

If the pivot axis 149 of the second pressure member 147B is in this range D, the trailing end part 106*d* of the check 106 will be reliably pushed to the second storage unit side wall 131 by the second pressure member 147B that is urged by the second urging member even if the trailing end part 106*d* of the check 106 fed along the diagonal guide wall 136 into the first check storage unit 113 tends to stop at the diagonal guide wall 136. The path of the next check 106 will therefore not be obstructed.

As described above, after transportation is completed and the trailing end of the check has passed the nipping position, a first pressure member pushes the trailing end of the check to the in-feed roller side in the check processing apparatus according to first embodiment of the invention. Therefore, even if a load in the direction obstructing check advancement is applied to a check, the trailing end part of the check will not separate laterally from the in-feed roller. As a result, the check will be fed by the in-feed roller reliably into the check storage unit. Problems such as being unable to feed the next check into the check storage unit because the leading end of the next check collides with the trailing end part of a preceding check that was not completely stored in the check storage unit, or the trailing end part of a preceding check that is bent laterally during transportation, can thus be prevented.

Furthermore, after transportation is completed and the trailing end of the check has passed the nipping position, the second pressure member moves the trailing end part of the check toward the second storage unit side wall in the check processing apparatus according to second embodiment of the invention. Therefore, even if the check fed into the check storage unit bends such that the trailing end tends to stay near the nipping position, the trailing end part of the check is pushed away and moved toward the second storage unit side wall. The trailing end part of a previously advanced check will therefore not obstruct the path of the next incoming check. The following check will therefore not collide with the trailing end of a check inside the check storage unit, and paper jams can be prevented.

The invention can also be used in a media storage apparatus for storing sheet media other than checks, promissory notes, invoices, and similar instruments. The invention can, for example, be used as a media storage apparatus incorporate in a printer, scanner, or other media processing apparatus.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A media storage apparatus comprising:
- a media storage unit that stores sheet media;
- an in-feed roller that conveys sheet media into the media storage unit in a transportation direction, the in-feed roller comprising:
  - a roller body,
  - cylindrical parts disposed coaxially with respect to the axis of the roller body, one cylindrical part positioned at one axial end of the roller body and another cylindrical part positioned at the other axial end of the roller body, each cylindrical part having a diameter that is greater than the diameter of the roller body, and
  - a plurality of protrusions projecting radially outward from outer surfaces of the cylindrical parts;
- a pressure roller that presses sheet media to the roller body at a sheet media nipping position; and
- a pressure member that pushes a part of a sheet medium toward the in-feed roller after the sheet medium passes the sheet media nipping position;
- wherein top and bottom end portions of sheet medium contact at least some of the plurality of protrusions as the sheet medium is pushed by the pressure member.

2. The media storage apparatus described in claim 1, wherein:
- the pressure member is configured to move toward and away from the in-feed roller; and
- the media storage apparatus further comprises a first urging member that urges the pressure member toward the in-feed roller.

3. The media storage apparatus described in claim 2, wherein:
- the pressure member has a pivot point at an axle of the pressure roller to pivot toward and away from the in-feed roller.

4. The media storage apparatus described in claim 3, wherein:
- the pressure member has a concavely curved pressure surface corresponding to an outer surface of the in-feed roller; and
- the concavely curved pressure surface further being disposed on a downstream side of the sheet media nipping position in the transportation direction.

5. The media storage apparatus described in claim 1, further comprising:
- a diagonal guide surface that guides sheet media advanced from the sheet media nipping position to the media storage unit;
- a first storage unit side wall that extends in the transportation direction contiguously to the diagonal guide surface; and
- a media pressure member that presses sheet media conveyed into the media storage unit toward the first storage unit side wall.

6. The media storage apparatus described in claim 1, further comprising:
- a diagonal guide surface that guides sheet media advanced from the sheet media nipping position to the media storage unit;
- a first storage unit side wall that extends in the transportation direction contiguously to the diagonal guide surface;
- a second storage unit side wall facing the first storage unit side wall; and
- a media pressure member that guides sheet media conveyed into the media storage unit from the diagonal guide surface toward the second storage unit side wall and pushes sheet media to the second storage unit side wall.

7. The media storage apparatus described in claim 1, wherein:
- the plurality of protrusions are separated in the axial direction from both axial ends of the roller body.

8. The media storage apparatus described in claim 1, wherein:
- the roller body and the cylindrical parts are a unimorphous molding.

9. The media storage apparatus described in claim 1, wherein:
- the roller body and the cylindrical parts are a unimorphous molding made from an elastic material.

10. The media storage apparatus described in claim 1, wherein:
- the media storage unit comprises a second storage unit side wall facing the first storage unit side wall and positioned on the in-feed roller side in the transportation direction; and
- a second pressure member that pushes sheet media past the sheet media nipping position toward the second storage unit side wall.

11. The media storage apparatus described in claim 10, wherein:
- the second pressure member is movable toward and away from the second storage unit side wall; and
- the media storage apparatus further comprising a second urging member that urges the second pressure member toward the second storage unit side wall.

12. The media storage apparatus described in claim 10, wherein the second pressure member is pivotally attached to pivot toward and away from the second storage unit side wall.

13. The media storage apparatus described in claim 12, wherein the second pressure member can pivot to a position closer to the second storage unit side wall than the in-feed roller.

14. The media storage apparatus described in claim 12, wherein a pivot axis of the second pressure member is a pivot axis of the pressure roller.

15. The media storage apparatus described in claim 10, wherein:

the media storage unit comprises a diagonal guide surface that guides sheet media advanced from the sheet media nipping position to the media storage unit; and the pivot axis of the second pressure member is positioned between the sheet media nipping position and the downstream end of the diagonal guide surface in the transportation direction.

16. The media storage apparatus described in claim 10, further comprising:

a media pressure member that guides and pushes sheet media conveyed to the media storage unit to the second storage unit side wall.

17. The media storage apparatus described in claim 10, wherein:

the second pressure member is attached to the first pressure member and is urged by the first urging member toward the second storage unit side wall.

18. A media processing apparatus comprising the media storage apparatus of claim 1, the media processing apparatus further comprising:

a transportation path that conveys sheet media; and an information reader that reads information from sheet media conveyed along the transportation path;

wherein the media storage apparatus stores sheet media discharged from the transportation path after the information is read.

* * * * *